US012480663B2

(12) United States Patent
Grochowicz et al.

(10) Patent No.: US 12,480,663 B2
(45) Date of Patent: Nov. 25, 2025

(54) SECUREMENT AND RELEASE ASSEMBLY FOR A COMPONENT OF AN APPLIANCE, APPLIANCE INCLUDING THE SAME AND OVEN INCLUDING THE SAME FOR A REFILLABLE WATER RESERVOIR FOR USE WITH STEAM COOKING

(71) Applicant: WHIRLPOOL CORPORATION, Benton Harbor, MI (US)

(72) Inventors: Ivana Helena Grochowicz, Santa Catarina (BR); Sergio Ricardo Jager, Rio Claro (BR); Leonardo Poma, Saronno (IT)

(73) Assignee: Whirlpool Corporation, Benton Harbor, MI (US)

( * ) Notice: Subject to any disclaimer, the term of this patent is extended or adjusted under 35 U.S.C. 154(b) by 437 days.

(21) Appl. No.: 17/984,892

(22) Filed: Nov. 10, 2022

(65) Prior Publication Data
US 2024/0159399 A1 May 16, 2024

(51) Int. Cl.
*F24C 15/08* (2006.01)
*A47J 27/04* (2006.01)
*F16M 13/02* (2006.01)

(52) U.S. Cl.
CPC .............. *F24C 15/08* (2013.01); *A47J 27/04* (2013.01); *F16M 13/02* (2013.01); *A47J 2027/043* (2013.01)

(58) Field of Classification Search
CPC ......... F24C 15/08; F24C 15/003; A47J 27/04; A47J 2027/043; F16M 13/02
See application file for complete search history.

(56) References Cited

U.S. PATENT DOCUMENTS 9,895,969 B2  2/2018 Alexander et al.
2008/0075823 A1*  3/2008 Jeon ...................... F24C 15/327
99/325

(Continued)

FOREIGN PATENT DOCUMENTS

AU  2018366936 A1  4/2020
CN  102563728 A  7/2012
(Continued)

OTHER PUBLICATIONS

English Translation of CN 209235854U (Year: 2019).*

*Primary Examiner* — Connor J Tremarche
(74) *Attorney, Agent, or Firm* — Price Heneveld LLP

(57) ABSTRACT

A securement and release assembly for an appliance component including: (a) a platform to couple to an appliance cabinet, the platform including a track; (b) a push-push latch attached to the platform including a mating feature receiver; and (c) a locking member slidably coupled to the track including a mating feature engagable with the mating feature receiver of the push-push latch, wherein (i) the locking member slides along the track toward the mating feature receiver to transition from an unlatched state not latched within the mating feature receiver, to a latched state, wherein the mating feature is inserted into the mating feature receiver and latched therein, (ii) the locking member interactable with the appliance component to secure the component to the appliance when the locking member takes the latched state, and (iii) the component can be decoupled from the locking member when the locking member takes the unlatched state.

19 Claims, 20 Drawing Sheets

(56) References Cited

U.S. PATENT DOCUMENTS

| | | |
|---|---|---|
| 2009/0039745 A1 | 2/2009 | Wong |
| 2009/0320371 A1 | 12/2009 | Hill et al. |
| 2010/0026015 A1 | 2/2010 | Joerger et al. |
| 2018/0255996 A1 | 9/2018 | Pruitt |
| 2018/0347893 A1 | 12/2018 | Karl |
| 2020/0245807 A1 | 8/2020 | Bhosale et al. |
| 2020/0352382 A1 | 11/2020 | Ball et al. |
| 2021/0161027 A1 * | 5/2021 | Inda .................. H05K 7/20172 |

FOREIGN PATENT DOCUMENTS

| | | | |
|---|---|---|---|
| CN | 105351979 A | | 2/2016 |
| CN | 208524521 U | | 2/2019 |
| CN | 209235854 U | * | 8/2019 |
| CN | 209547812 U | | 10/2019 |
| CN | 210043791 U | | 2/2020 |
| CN | 210121082 U | | 3/2020 |
| EP | 2584270 A1 | | 4/2013 |
| EP | 3581852 A1 | | 12/2019 |
| FR | 2958722 A1 | | 10/2011 |
| KR | 20080028729 A | | 4/2008 |
| KR | 20090098715 A | | 9/2009 |
| WO | 2015057855 A1 | | 4/2015 |

\* cited by examiner

SECUREMENT AND RELEASE ASSEMBLY FOR A COMPONENT OF AN APPLIANCE, APPLIANCE INCLUDING THE SAME AND OVEN INCLUDING THE SAME FOR A REFILLABLE WATER RESERVOIR FOR USE WITH STEAM COOKING

BACKGROUND OF THE DISCLOSURE

The present disclosure generally relates to a mechanism to facilitate the insertion and removal of a component of an appliance, and more specifically, to a securement and release mechanism to facilitate the insertion and removal of a water reservoir of an oven that has steam cooking functionality.

Household appliances sometimes include a component that is selectively insertable and removable from a remainder of the appliance, such as the cabinet. However, there is a problem in that the associated mechanism to secure and release the component is sometimes sub-optimally complex and expensive.

SUMMARY OF THE DISCLOSURE

The present disclosure addresses that problem with a securement and release assembly that includes a sliding locking member that can selectively latch into a push-push latch. The sliding locking member remains attached to the securement and release assembly and engages with the water reservoir and the push-push latch as the water reservoir is inserted into the oven to secure the water reservoir coupled to the oven. Upon a subsequent push of the water reservoir into the oven, the push-push latch releases the locking member, and a spring of the securement and release assembly causes the locking member to push the water reservoir and partially eject the water reservoir from the oven. As the water reservoir is retracted from the oven, the locking member disengages from the water reservoir.

According to one aspect of the present disclosure, a securement and release assembly for a component of an appliance comprises: (a) a platform configured to couple to a cabinet of an appliance, the platform comprising a track; (b) a push-push latch attached to the platform, the push-push latch comprising a mating feature receiver; and (c) a locking member slidably coupled to the track of the platform, the locking member comprising a mating feature configured to engage with the mating feature receiver of the push-push latch, wherein (i) wherein, the locking member slides along the track toward the mating feature receiver of the push-push latch to transition from an unlatched state, wherein the mating feature is not latched within the mating feature receiver of the push-push latch, to a latched state, wherein the mating feature is inserted into the mating feature receiver of the push-push latch and latched therein, (ii) the locking member is configured to interact with a component of an appliance to secure the component to the appliance when the locking member takes the latched state, and (iii) the component can be decoupled from the locking member when the locking member takes the unlatched state.

According to another aspect of the present disclosure, an appliance comprises: (a) a cabinet; (b) a platform attached to the cabinet, the platform comprising a track; (c) a push-push latch attached to the platform, the push-push latch comprising a mating feature receiver; (d) a locking member slidably coupled to the track of the platform, the locking member comprising (i) a first member and a second member extending from a junction, the first member and the second member separated by an angle, (ii) a mating feature extending from the first member configured to interact with the mating feature receiver of the push-push latch, (iii) a projection extending from the second member, (iv) a latched state where the mating feature is inserted into the mating feature receiver of the push-push latch and latched therein, and (v) an unlatched state where the mating feature is not latched within the mating feature receiver of the push-push latch; (e) a spring comprising (i) a first end attached to the first member of the locking member and (ii) a second end attached to the platform; and (f) a component comprising (i) a recess configured to engage with the projection extending from the second member of the locking member, (ii) an inserted state, and (iii) a retracted state, the component being disposed further into the appliance in the inserted state than in the retracted state, and in the retracted state, the component is at least partially ejected from the appliance, wherein, when the component is in the inserted state and the locking member is in the latched state, the projection extending from the second cantilever of the locking member is engaged with the recess of the component, the projection and the recess resisting movement of the component away from the inserted state.

According to yet another aspect of the present disclosure, an oven for cooking food comprises: (a) a cabinet; (b) a platform attached to the cabinet, the platform comprising a track; (c) a push-push latch attached to the platform, the push-push latch comprising a mating feature receiver; (d) a locking member slidably coupled to the track of the platform, the locking member comprising (i) a first member and a second member extending from a junction, the first member and the second member separated by an angle, (ii) a mating feature extending from the first member configured to interact with the mating feature receiver of the push-push latch, (iii) a projection extending from the second member, (iv) a latched state where the mating feature is inserted into the mating feature receiver of the push-push latch and latched therein, and (v) an unlatched state where the mating feature is not latched within the mating feature receiver of the push-push latch; (e) a spring comprising (i) a first end attached to the first member of the locking member and (ii) a second end attached to the platform; (f) a water reservoir comprising (i) a recess configured to engage with the projection extending from the second member of the locking member, (ii) an inserted state, (iii) a retracted state, the water reservoir being disposed further into the appliance in the inserted state than in the retracted state, and in the retracted state, the water reservoir is at least partially ejected from the appliance, and (iv) a chamber configured to hold water; (g) a cooking chamber configured to accept food for cooking; and (h) a steam generating system configured (i) to obtain water from the water reservoir when the water reservoir is in the inserted state and (ii) to transform the water into steam for subsequent delivery to the cooking chamber; wherein, when the water reservoir is in the inserted state and the locking member is in the latched state, the projection extending from the second member of the locking member is engaged with the recess of the water reservoir, the projection and the recess resisting movement of the water reservoir away from the inserted state; wherein, as the water reservoir transitions from the retracted state to the inserted state, the water reservoir pushes the first member of the locking member (i) causing the locking member to tilt and the projection of the locking member to engage with the recess of the water reservoir, (ii) causing the locking member to slide along the track of the platform until the mating feature extending from the first member of the locking member to enter the mating feature receiver of the push-push latch thereby placing the locking member in the latched position, and (iii) causing the first end of the spring to move towards the second end of the spring thus energizing the spring; and wherein, a force pushing the water reservoir further into the oven after being in the inserted state and subsequent release of the force cause (i) the locking member to take the unlatched state, unlatched from the push-push latch, (ii) the spring to push the locking member along the track of the platform away from the push-push latch with the locking member pivoting so that the projection extending from the second member disengages from the recess of the water reservoir, and (iii) the water reservoir to at least partially eject from the oven.

These and other features, advantages, and objects of the present disclosure will be further understood and appreciated by those skilled in the art by reference to the following specification, claims, and appended drawings.

Figure 1:
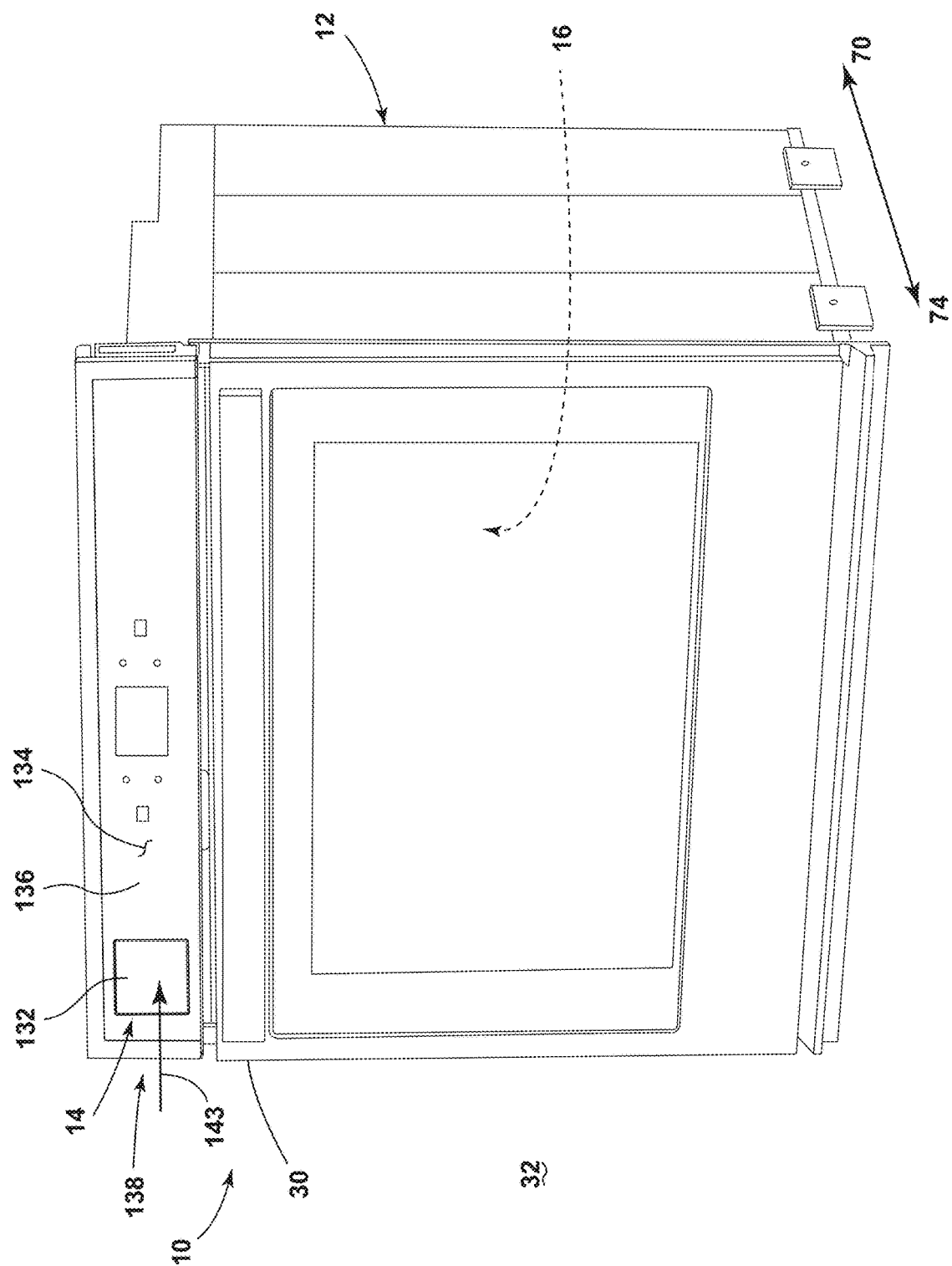
FIG. 1 is a perspective view of an oven with a water reservoir in an inserted state, able to provide water that can be converted into steam for use with steam cooking functionality.

The components in the figures are not necessarily to scale, emphasis instead being placed upon illustrating the principles described herein.

DETAILED DESCRIPTION

The present illustrated embodiments reside primarily in combinations of method steps and apparatus components related to a securement and release assembly to selectively secure and release a component of an appliance, such as a water reservoir of an oven with steam cooking functionality. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
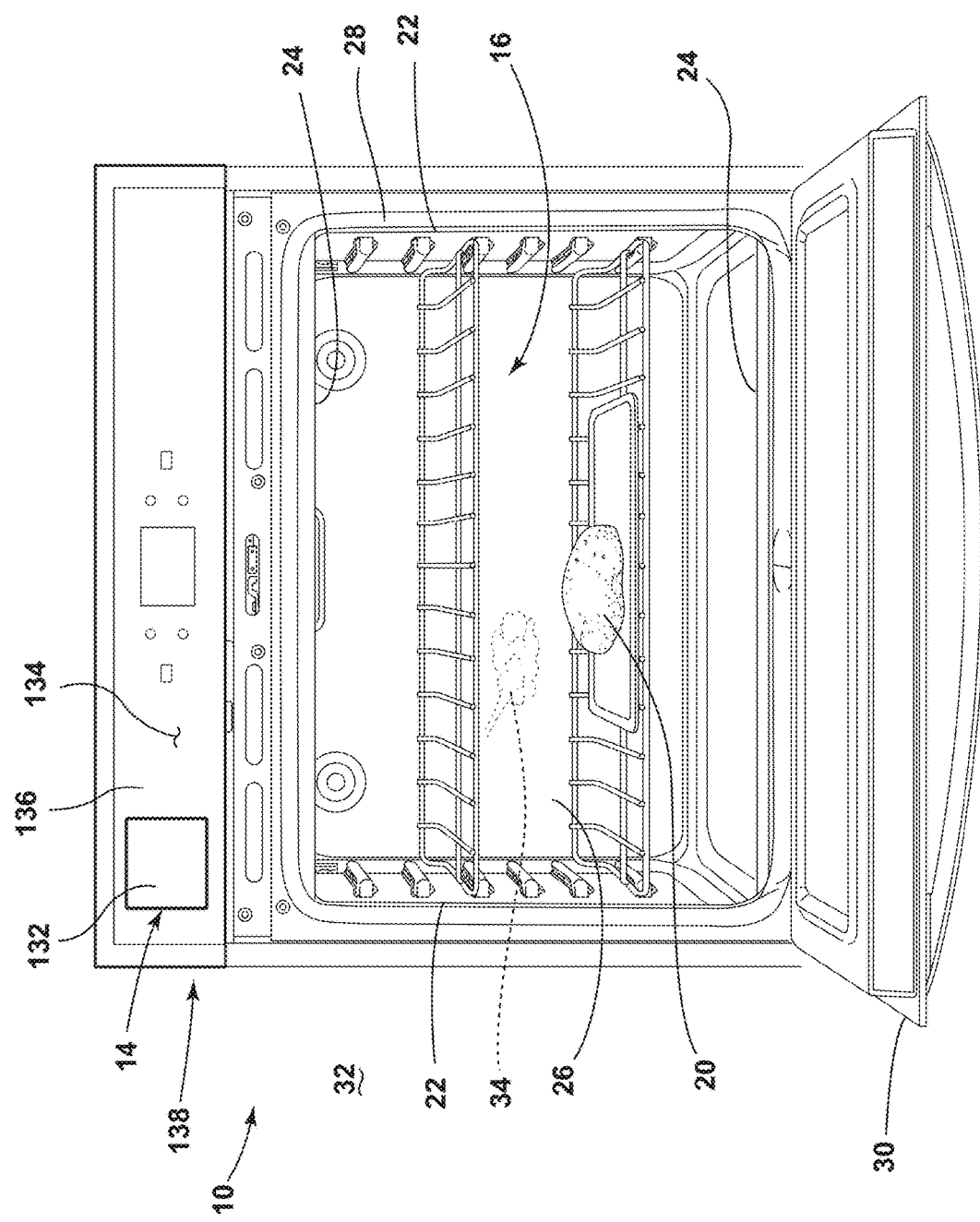
FIG. 2 is a front elevational view of the oven of FIG. 1, illustrating a door in an open position revealing a cooking chamber and food being cooked therein in the presence of steam.
Figure 3:
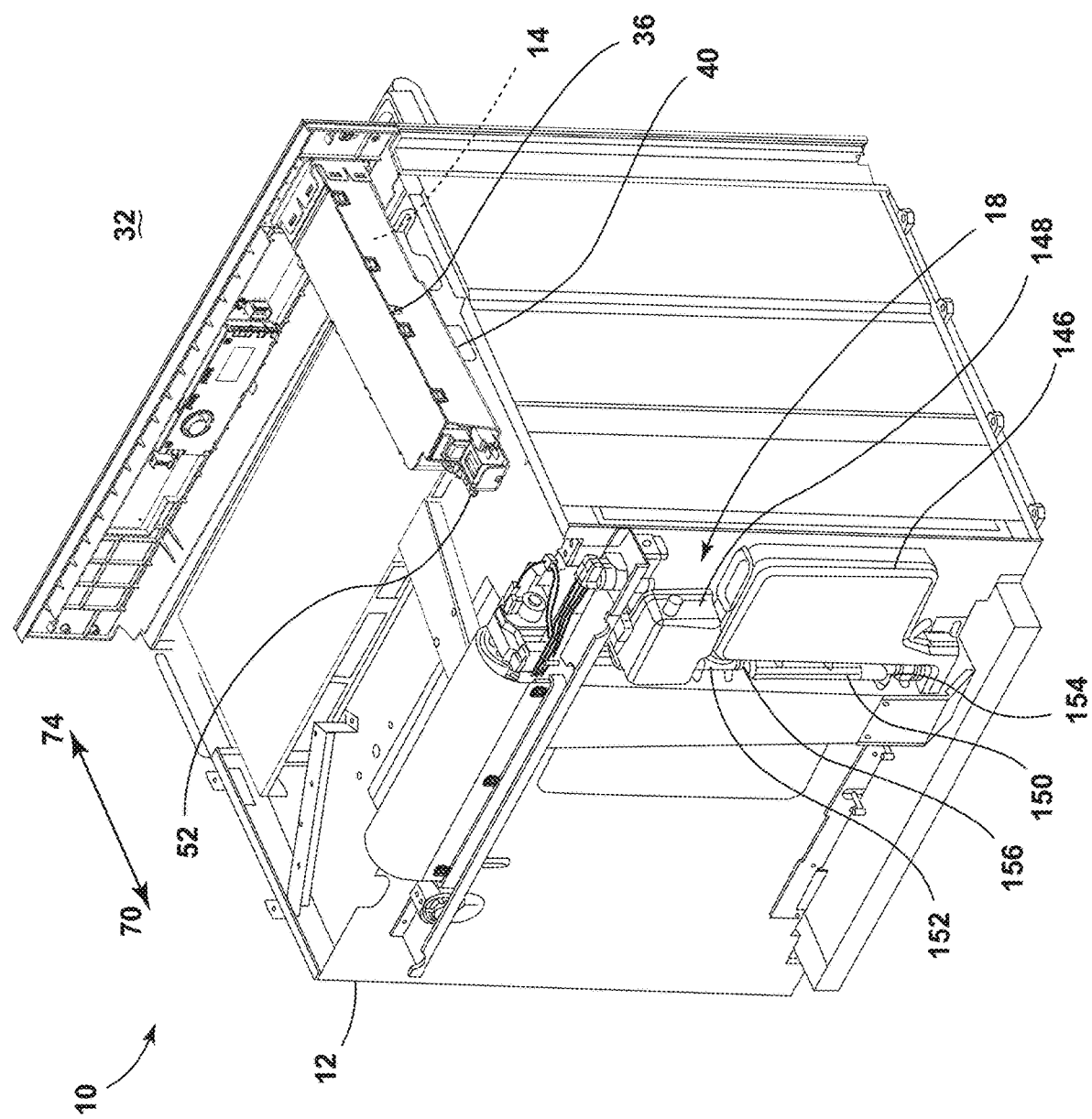
FIG. 3 is a rear overhead perspective view of the oven of FIG. 1, illustrating a cabinet supporting a steam generating system and a housing for the water reservoir in fluid communication with the steam generating system.

Referring to FIGS. 1-3, an appliance, specifically an oven 10, includes a cabinet 12, a water reservoir 14, a cooking chamber 16, and a steam generating system 18. The cooking chamber 16 is configured to accept food 20 for cooking. For example, in embodiments, the oven 10 includes a pair of opposing vertical walls 22, a pair of opposing horizontal walls 24, a rear wall 26, an opening 28, and a door 30 defining the cooking chamber 16. The door 30 is openable and closeable to provide selective access to the cooking chamber 16 from an external environment 32. As further discussed below, the oven 10 provides steam cooking functionality (e.g., the ability to cook the food 20 within the cooking chamber 16 in the presence of steam 34). The oven 10 can be a wall oven or a range oven, among other options. The external environment 32 can be located in a kitchen, and a user can be located in the external environment 32 operating the oven 10.

Figure 4:
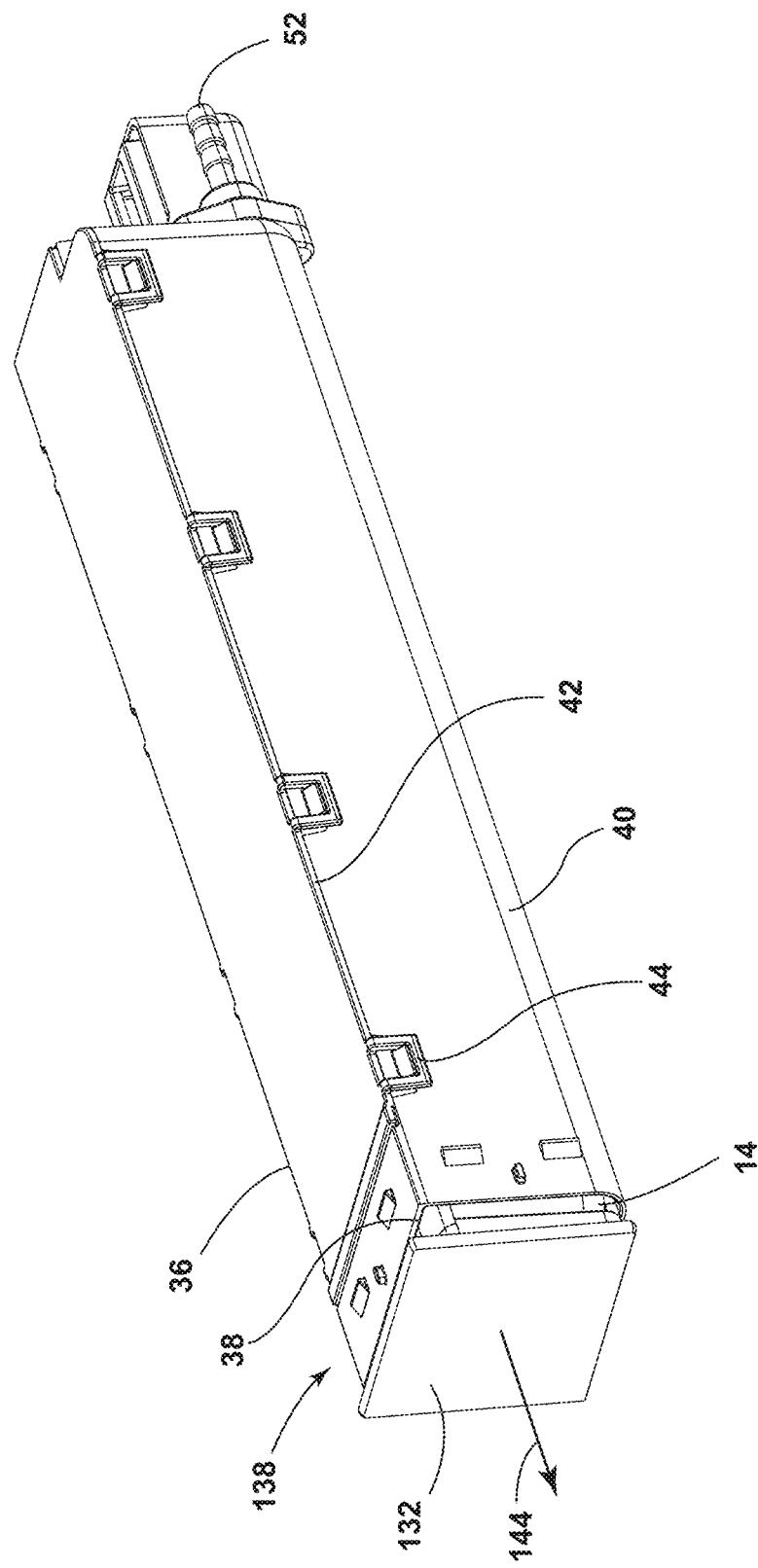
FIG. 4 is a front overhead perspective view of the housing of FIG. 3 and the water reservoir of FIG. 1 disposed within the housing in the inserted state.
Figure 5:
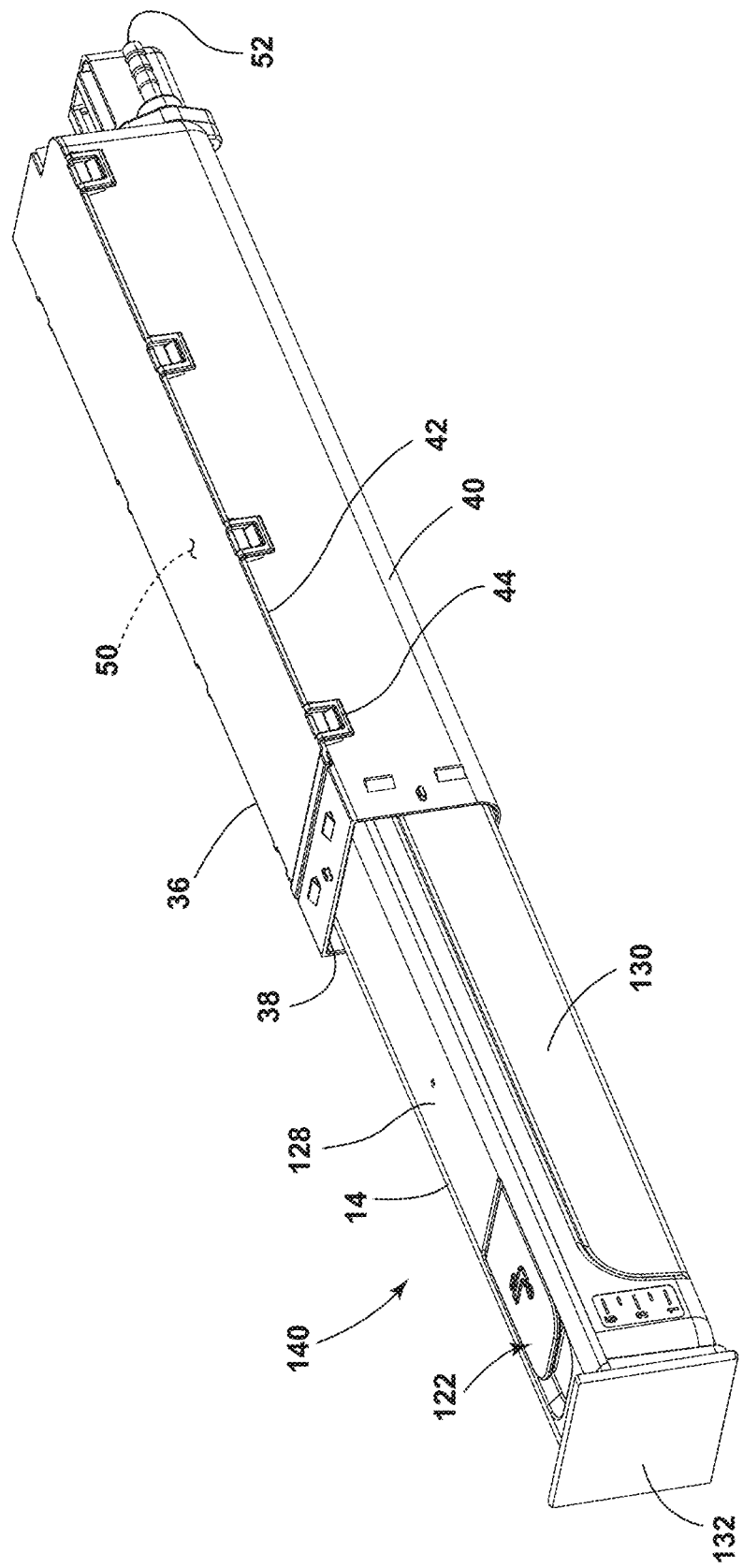
FIG. 5 is the same view as FIG. 4 but this time illustrating the water reservoir in a retracted state where the water reservoir would be partially ejected from the oven, which allows a user to fill the water reservoir with water.
Figure 6:
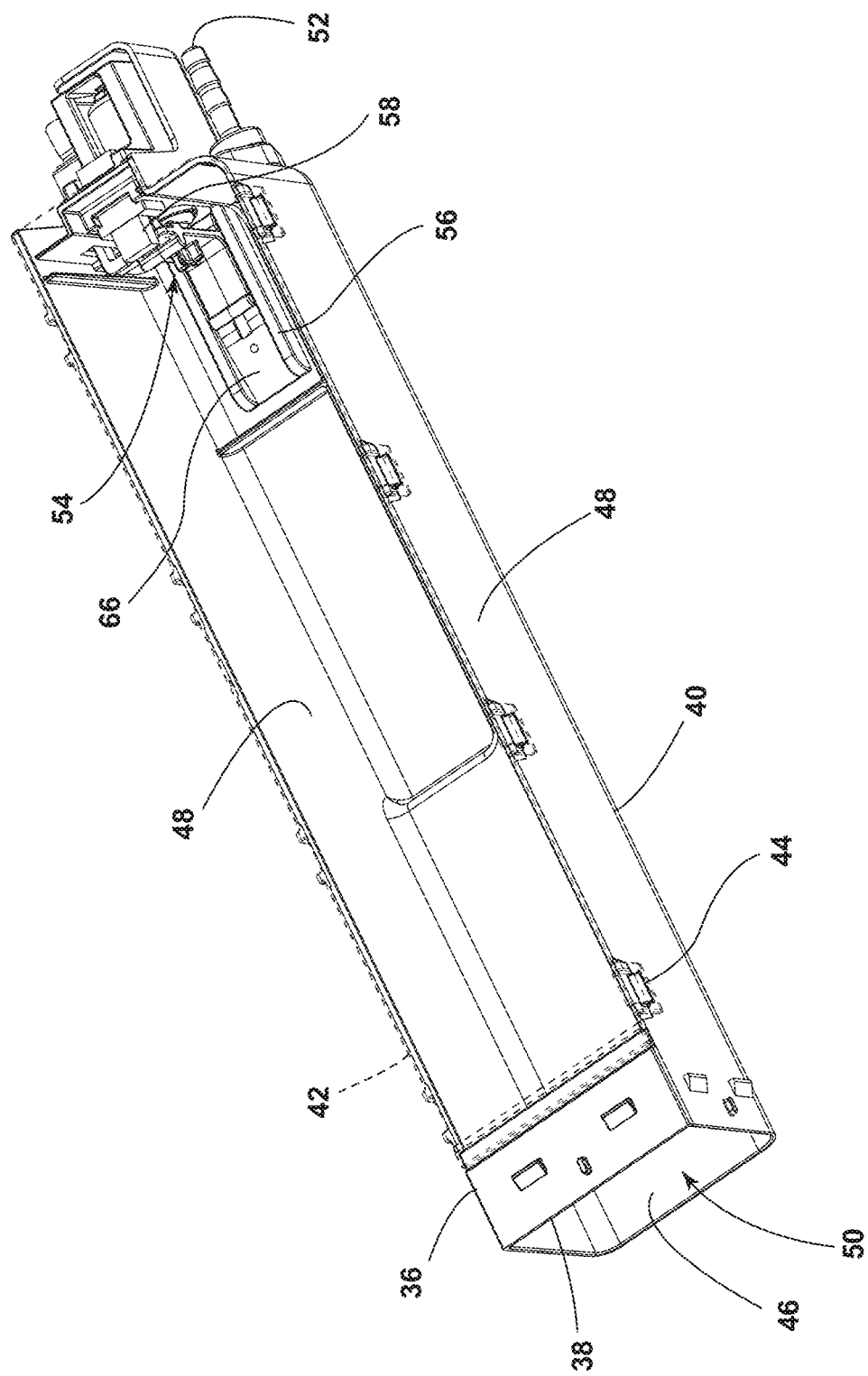
FIG. 6 is an overhead perspective view of the housing of FIG. 3, with a cover of the housing shown in phantom view, illustrating a securement and release assembly coupled to the housing and accessible from a chamber of the housing into and out of which the water reservoir can be made to slide.
Figure 7:
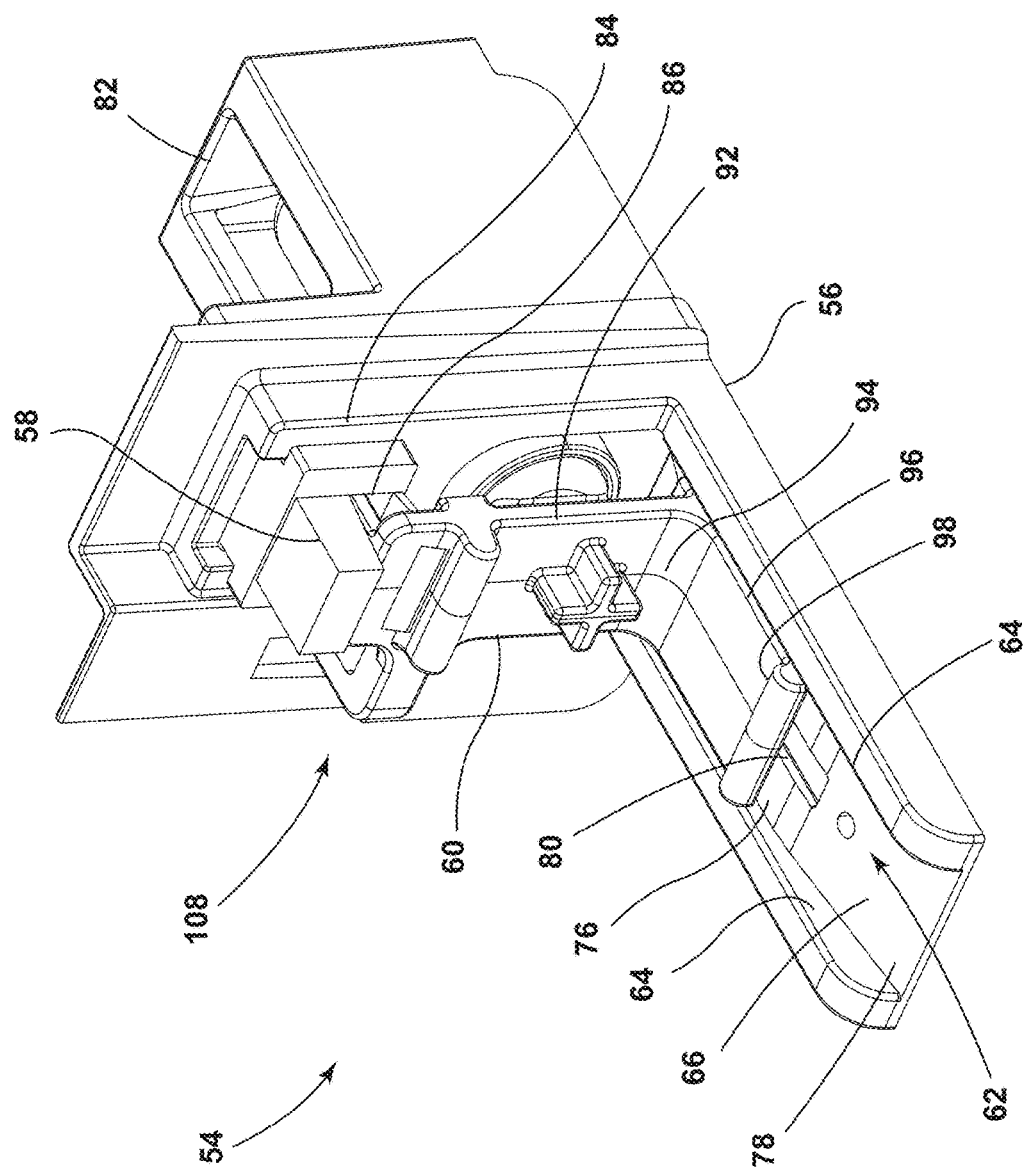
FIG. 7 is a front perspective view of the securement and release assembly of FIG. 6, illustrating a locking member in a latched state latched to a push-push latch supported by a platform of the securement and release assembly.
Figure 8:
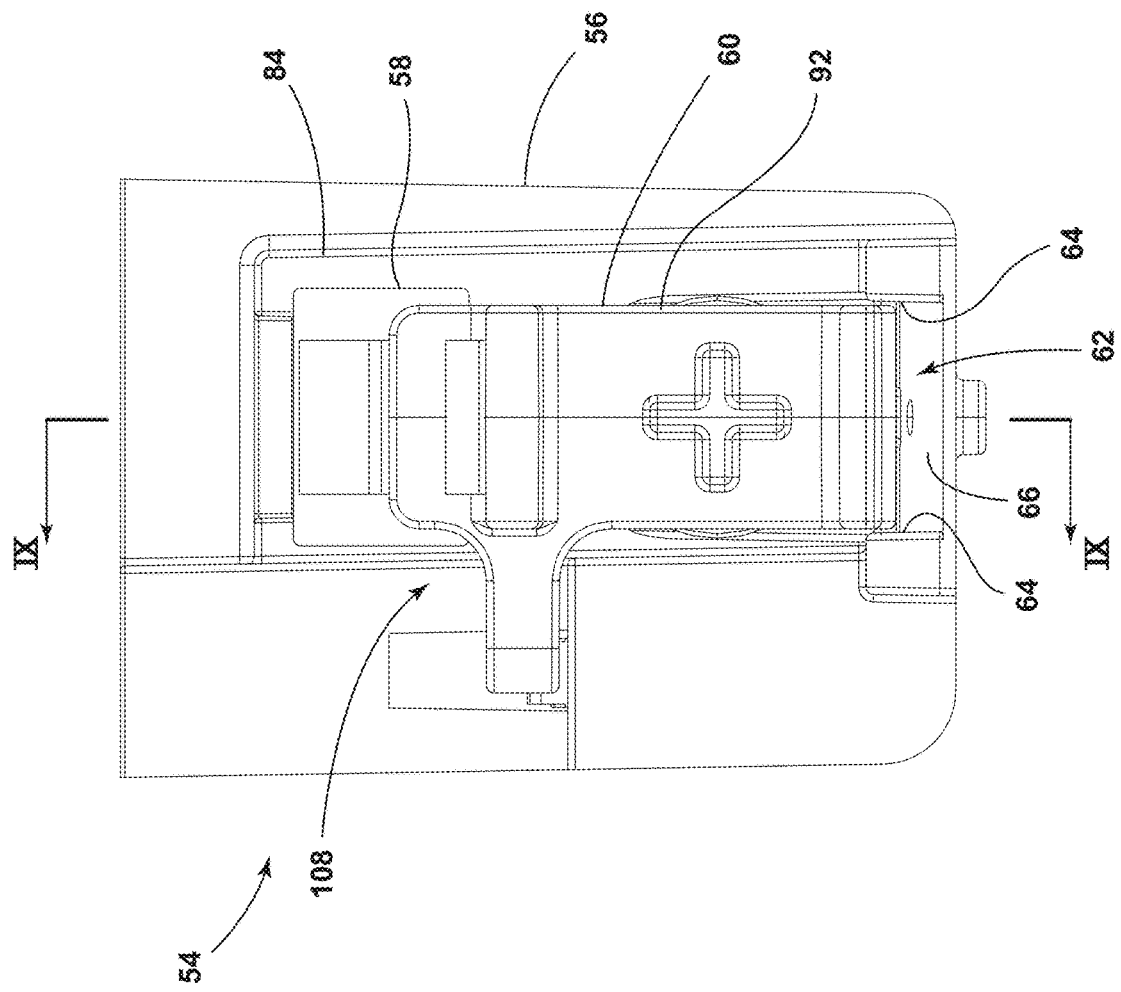
FIG. 8 is a front elevational view of the securement and release assembly of FIG. 6, illustrating a structural support of the platform supporting the push-push latch in a static position.

Referring additionally to FIGS. 4-6, the oven 10 further includes a housing 36 for the water reservoir 14. The housing 36 is coupled to the cabinet 12. The housing 36 includes an opening 38. The water reservoir 14 can be extracted from the housing 36 through the opening 38. In embodiments, the housing 36 includes a body 40 and a cover 42 that is attached to the body 40. The cover 42 can be attached to the body 40 via snap-fit features 44. The body 40 provides a floor 46 and opposing sidewalls 48. The floor 46, the opposing sidewalls 48, and the cover 42 define a chamber 50 for the water reservoir 14. The housing 36 further includes an outlet 52 through which water from the water reservoir 14 can flow for use by the steam generating system 18. As will be further discussed below, the water reservoir 14 can slide into and out of the chamber 50 through the opening 38, allowing the user to add water to the water reservoir 14 for subsequent use by the steam generating system 18 during a steam cooking function.

Referring, additionally to FIGS. 7-12, the oven 10 further includes a securement and release assembly 54 for the water reservoir 14. The securement and release assembly 54 includes a platform 56, a push-push latch 58, and a locking member 60. The platform 56 supports the push-push latch 58 and the locking member 60. The platform 56 is configured to couple to the cabinet 12. For example, as in the illustrated embodiment, the platform 56 is attached to the housing 36, and the housing 36 is attached to the cabinet 12. In any event, the platform 56 remains static. As will be further discussed below, the securement and release assembly 54 is a mechanism that allows the user selectively (i) to withdraw the water reservoir 14 from the oven 10 to add water to the water reservoir 14 and (ii) secure the water reservoir 14 within to the oven 10 so that the steam generating system 18 can utilize the water.

The platform 56 includes a track 62. In embodiments, the platform 56 includes a pair of opposing sidewalls 64 and a floor 66 disposed between the pair of opposing sidewalls 64. The pair of opposing sidewalls 64 and the floor 66 at least partially define the track 62. The pair of opposing sidewalls 64 can be vertically oriented and extend upward from the floor 66. As will be further discussed below, the locking member 60 is able to slide along the track 62 in response to a force 68 (see FIG. 11) in a reward direction 70 toward the push-push latch 58 or a force 72 in a forward direction 74 away from the push-push latch 58. The floor 66 of the track 62 limits the downward movement of the locking member 60, and the pair of opposing sidewalls 64 limit the lateral movement of the locking member 60. The floor 66 of the track 62 includes a first floor portion 76 and a second floor portion 78 that is angled relative to the first floor portion 76. For example, the first floor portion 76 can be substantially horizontal while the second floor portion 78 is sloped downward relative to horizontal. The floor 66 further includes a slot 80 therethrough disposed between the opposing sidewalls 64. The slot 80 can be disposed medially between opposing sidewalls 64. The slot 80 limits the movement of the locking member 60 toward and from the push-push latch 58 (e.g., in the rearward direction 70 and the forward direction 74), as will be further discussed below. The platform 56 further includes a wall 82, which can be oriented substantially vertically and rearward of the track 62, and a structural support 84 for the push-push latch 58. The structural support 84 supporting the push-push latch 58 can be disposed forward of the wall 82 and rearward of the track 62.

As mentioned, the securement and release assembly 54 includes the push-push latch 58. A push-push latch is a latch that engages with a member. Pushing of the member into the push-push latch causes the push-push latch to latch onto the member and thus preventing release of the member from the push-push latch. A subsequent push of the member further into the push-push latch causes the latch to unlatch from the member and thus allows release of the member from the push-push latch. The push-push latch 58 is attached to the platform 56, such as at the structural support 84 of the platform 56. The push-push latch 58 includes a mating feature receiver 86. The mating feature receiver 86 engages with the locking member 60, as further discussed below. In embodiments, the mating feature receiver 86 is disposed elevationally above the floor 66 of the platform 56.

As mentioned, the securement and release assembly 54 includes the locking member 60. The locking member 60 includes a mating feature 88. The mating feature 88 is configured via its size and shape to engage with the mating feature receiver 86 of the push-push latch 58. When the mating feature 88 is pushed into the mating feature receiver 86 of the push-push latch 58, such as via the force 68 in the rearward direction 70, the push-push latch 58 latches onto the mating feature 88 and thus prevents release of the mating feature 88 of the locking member 60 from the push-push latch 58. A subsequent force 90 (see FIG. 9) of the mating feature 88 further into the push-push latch 58 (e.g., in the rearward direction 70) causes the push-push latch 58 to unlatch from the mating feature 88 and thus the mating feature 88 can be extracted from the mating feature receiver 86 of the push-push latch 58.

The locking member 60 further includes a first member 92 extending from a junction 94 and a second member 96 extending from the junction 94. An angle α separates the first member 92 from the second member 96. In embodiments, the angle α is approximately 90 degrees, the first member 92 extends vertically from the junction 94 and thus the track 62 of the platform 56, and the second member 96 extends horizontally in the forward direction 74 from the junction 94 (orthogonally to the first member 92) and thus sits upon the track 62 of the platform 56. The angle α separating the first member 92 and the second member 96 can be any of a right angle, an acute angle, or an obtuse angle as long as the locking member 60 serves the functions described herein. The mating feature 88 of the locking member 60 is disposed at the first member 92. In embodiments, the mating feature 88 extends in the rearward direction 70 from the first member 92 toward the wall 82 of the platform 56.

The locking member 60 further includes a projection 98 that extends from the second member 96. In embodiments, the projection 98 extends generally upward from the second member 96. The projection 98 interacts with the water reservoir 14, as further discussed below, to secure the water reservoir 14 to the push-push latch 58 within the oven 10.

The locking member 60 is slidably coupled to the track 62 of the platform 56. In embodiments, such as that illustrated, the locking member 60 further includes an appendage 100 extending from the junction 94. The appendage 100 extends downward from the junction 94 generally in an opposite direction as the first member 92 and generally orthogonally to the second member 96. The appendage 100 extends through the slot 80 through the floor 66 of the platform 56. The appendage 100 has an up-side down T-shape and extends laterally underneath the floor 66 of the platform 56. The appendage 100 thus limits upward movement of the locking member 60 relative to the platform 56. The appendage 100 of the locking member 60 and the slot 80 of the platform 56 cooperate to limit movement of the locking member 60 in the forward direction 74 and the rearward direction 70 along the track 62.

In embodiments, the securement and release assembly 54 further includes a spring 102. The spring 102 is attached to both the platform 56 and the locking member 60. The spring 102 can be oriented horizontally, aligned in the forward direction 74 and the rearward direction 70, like the track 62 and the slot 80 of the platform 56. For example, the spring 102 includes a first end 104 and a second end 106. The first end 104 of the spring 102 is disposed in the forward direction 74 relative to the second end 106. The first end 104 of the spring 102 is attached to the locking member 60, such as the first member 92 of the locking member 60. The second end 106 of the spring 102 is attached to the platform 56, such as the wall 82 of the platform 56. The spring 102 is disposed elevationally higher than the track 62 and elevationally lower than the push-push latch 58. As will be further discussed below, the spring 102 can become energized to move the locking member 60 in the forward direction 74 away from the push-push latch 58 and partially eject the water reservoir 14 from the housing 36 and thus from the oven 10.

Figure 11:
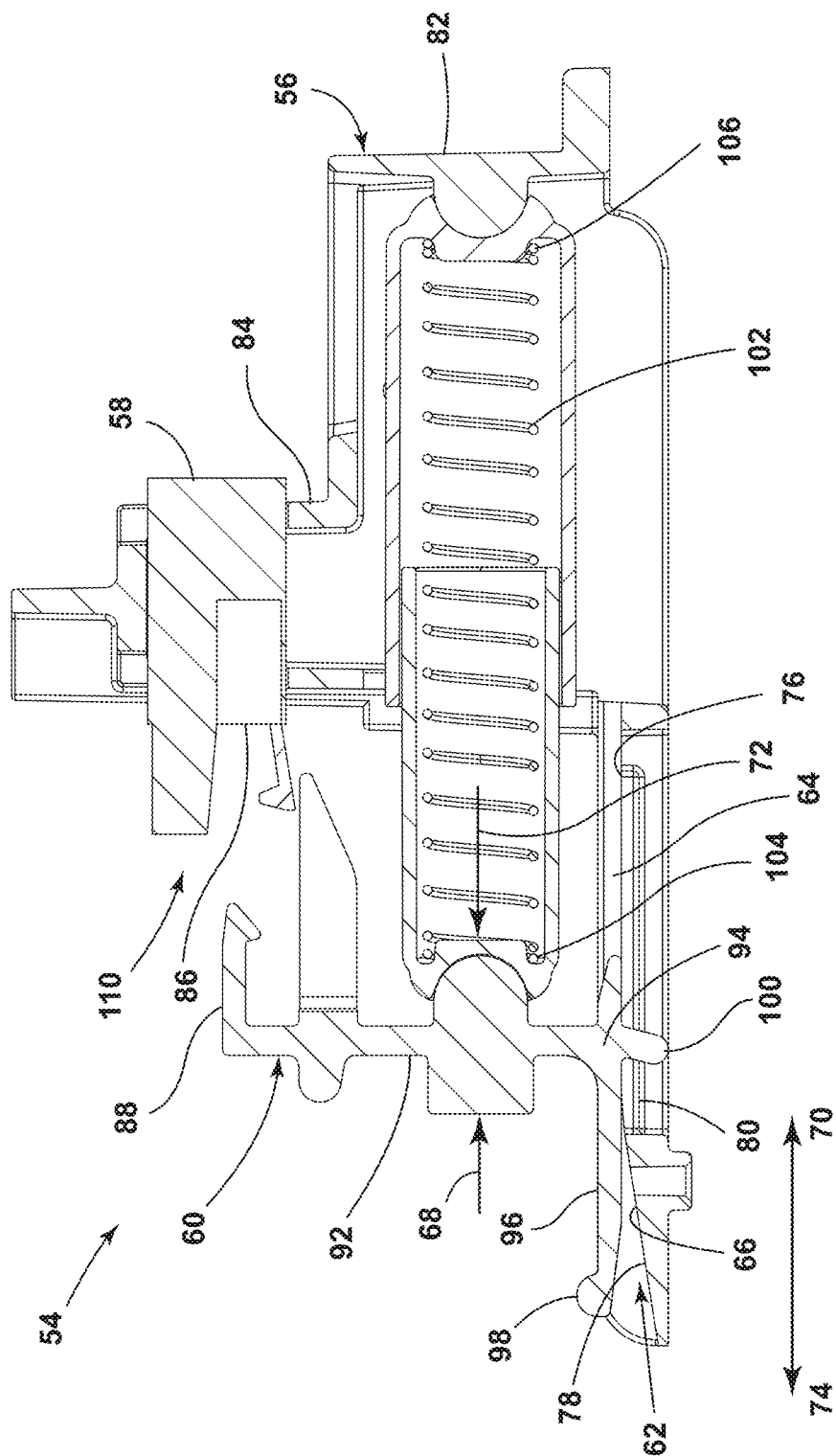
FIG. 11 is the same view as FIG. 9 but this time illustrating the locking member in an unlatched state and moving along a track provided by the platform either (i) in a forward direction away from the push-push latch in response to a force from the spring being in the energized state or (ii) in a rearward direction toward the push-push latch in response to a force (such as from a user pushing the water reservoir into the housing) in order to place the locking member in the latched state.
Figure 12:
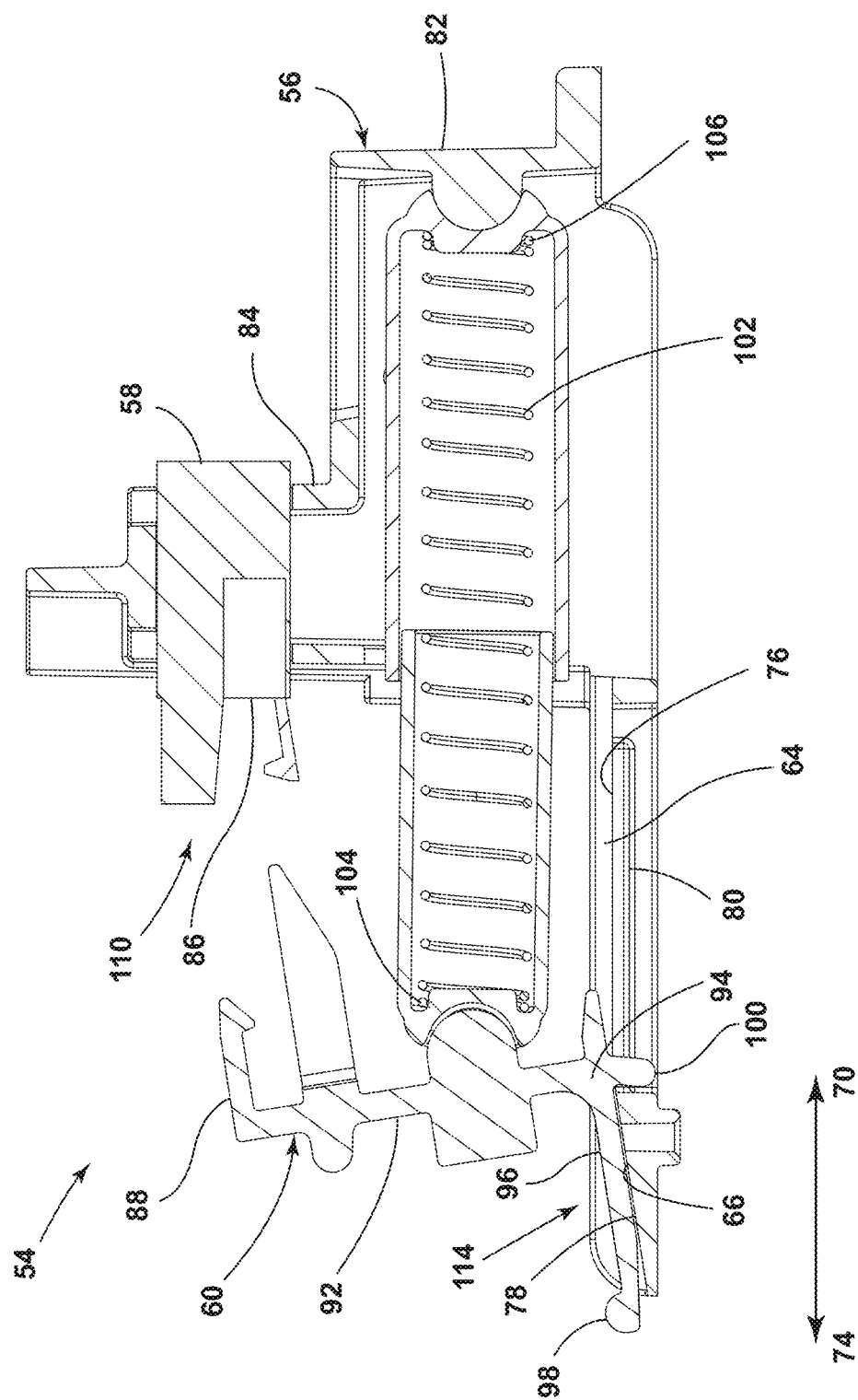
FIG. 12 is the same view of FIGS. 9 and 11 but this time illustrating the locking member still in the unlatched state at an extreme position along the track away from the push-push latch, and the locking member having tilted in response to a change in angle of the track with a projection extending from a second member of the locking member having decreased in elevation.
Figure 13:
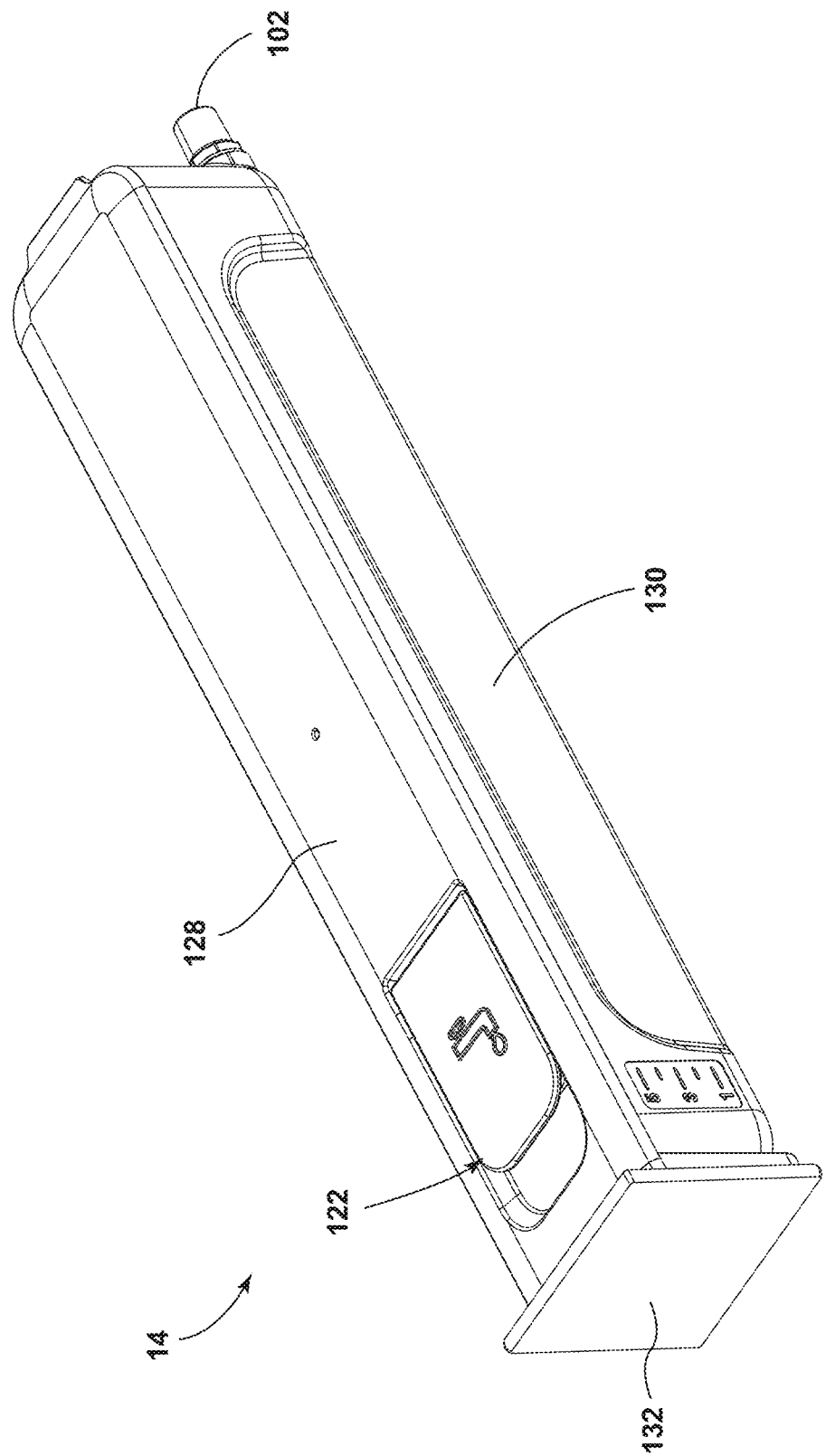
FIG. 13 is a top perspective view of the water reservoir of FIG. 1, illustrating the water reservoir including a cap that can be removed to add water to the water reservoir and an outlet that is in fluid communication with an outlet of the housing when the water reservoir is in the inserted state sufficiently so that the locking member is in the latched state.
Figure 14:
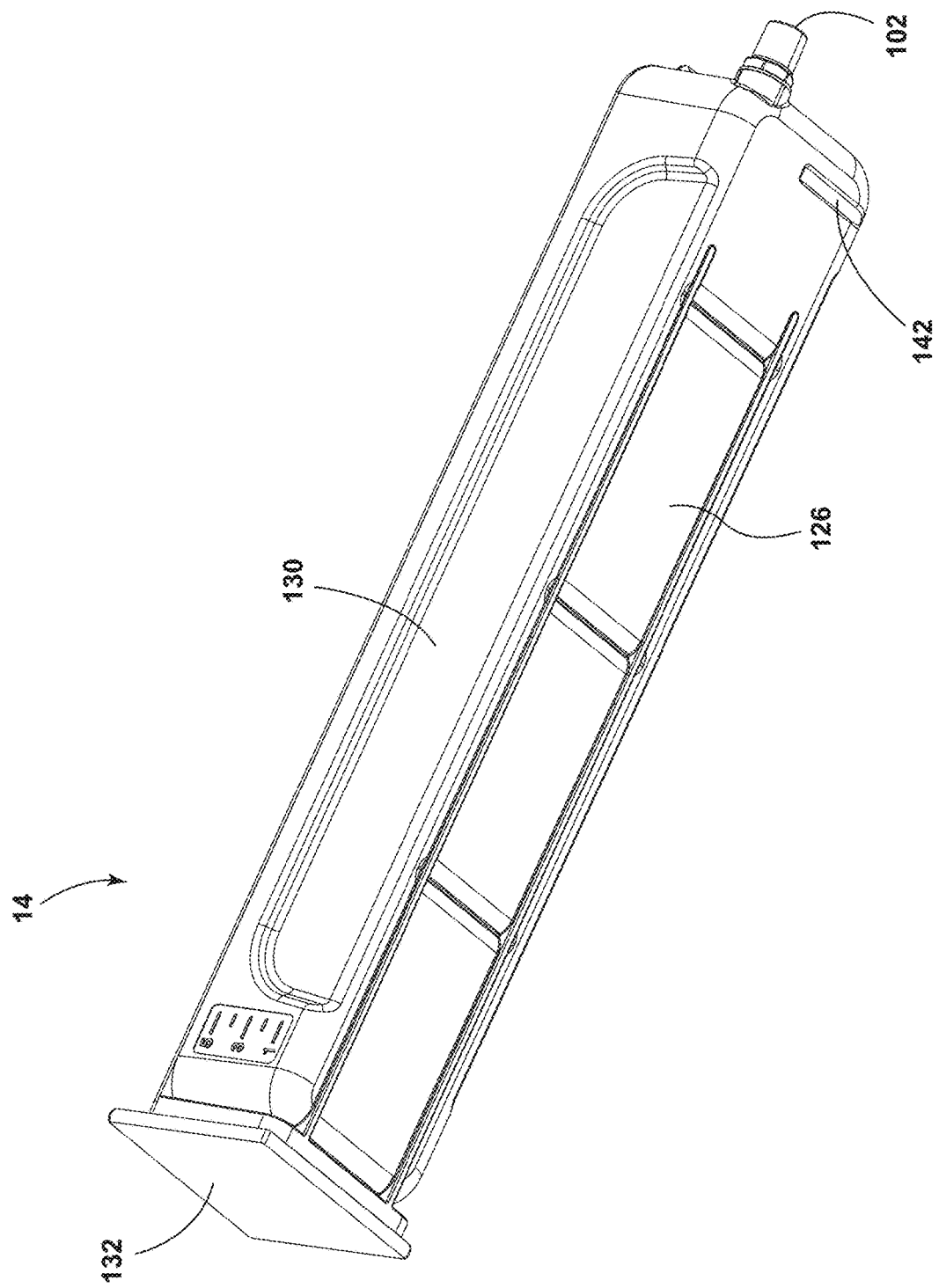
FIG. 14 is a bottom perspective view of the water reservoir of FIG. 1, illustrating the water reservoir further including a bottom and a sidewall that at least partially define a chamber to hold water.
Figure 15:
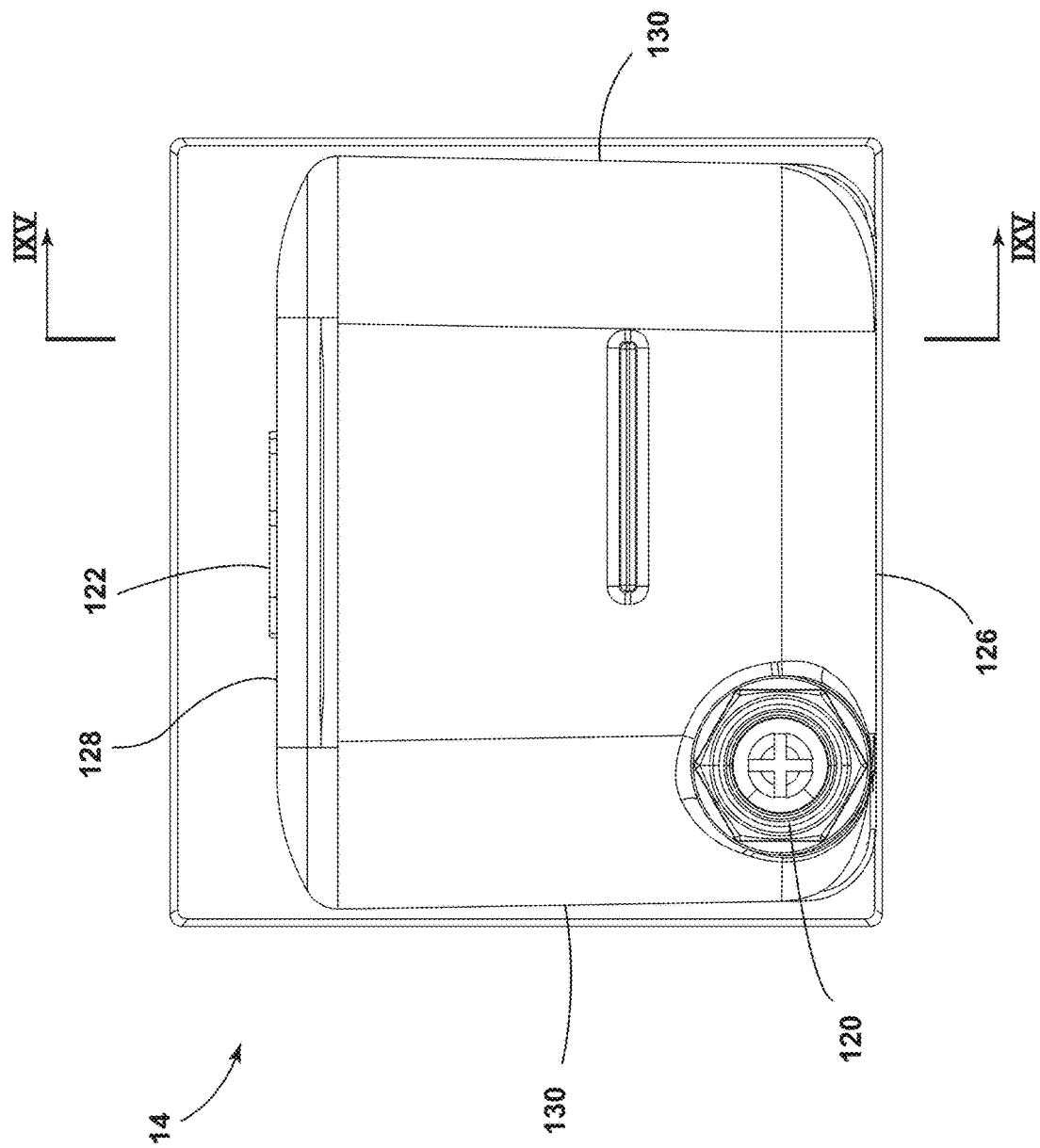
FIG. 15 is a rear elevational view of the water reservoir of FIG. 1, illustrating the outlet extending in the rearward direction.
Figure 16:
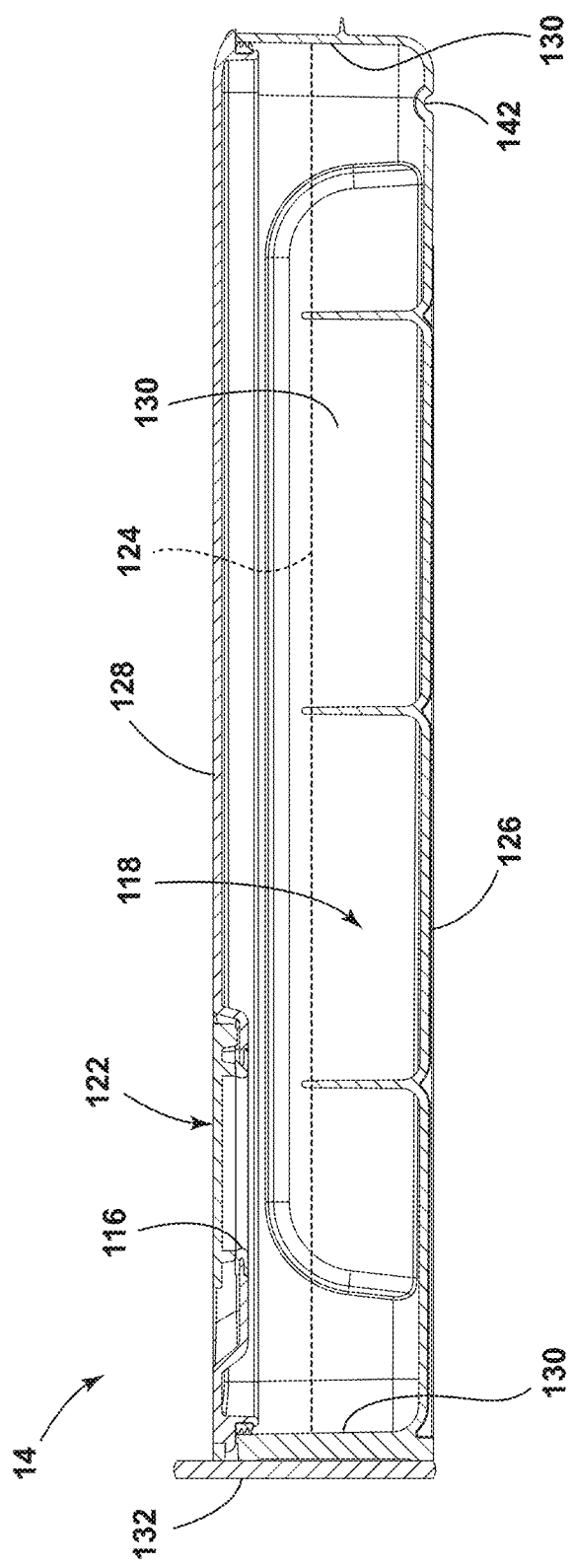
FIG. 16 is a side elevational view of a cross-section of the water reservoir of FIG. 1 taken through line XVI-XVI of FIG. 15, illustrating the water reservoir including a chamber to hold water that can be added to the chamber through an inlet that can be selectively accessed via a cap.

The locking member 60 has a latched state 108 (see, e.g., FIGS. 7-10) and an unlatched state 110 (see e.g., FIGS. 11-12). In the latched state 108, the mating feature 88 of the locking member 60 is inserted into the mating feature receiver 86 of the push-push latch 58 and latched therein. In contrast, in the unlatched state 110, the mating feature 88 is not latched within the mating feature receiver 86 of the push-push latch 58. When the locking member 60 takes the latched state 108, the spring 102 takes an energized state 112. Thus, in the energized state 112, the spring 102 imparts the force 72 (see, e.g., FIG. 9) against the first member 92 of the locking member 60 in the forward direction 74. The force 72 is insufficient to move the locking member 60 while the locking member 60 is in the latched state 108 latched to the push-push latch 58. However, the force 72 is sufficient to move the locking member 60 when the locking member 60 is in the unlatched state 110 and no other force is sufficient to counter the force 72. Thus, when the locking member 60 is in the unlatched state 110, the spring 102 biases the water reservoir 14 in the forward direction 74 partially ejected from the oven 10.

The locking member 60 slides along the track 62 while transitioning to, from, and between the unlatched state 110 and the latched state 108. Stated another way, the locking member 60 slides on the floor 66 of the platform 56, in either the forward direction 74 or the rearward direction 70 between the opposing sidewalls 64 of the platform 56, to transition into and out of the latched state 108. Assuming that the locking member 60 is in the unlatched state 110 and at an extreme position 114 (see e.g., FIG. 12) away from the push-push latch 58 in the forward direction 74, the force 68 upon the locking member 60 in the rearward direction 70 causes the locking member 60 to move towards the push-push latch 58 (as in FIG. 11). In embodiments where the floor 66 of the platform 56 has the second floor portion 78 that is sloped relative to horizontal, the second member 96 of the locking member 60 sits thereupon when the locking member 60 is in the extreme position 114 away from the push-push latch 58. In such embodiments, the force 68 causes the locking member 60 to move from the extreme position 114 towards the push-push latch 58 and additionally causes the locking member 60 to tilt as the second member 96 of the locking member 60 moves off of the second floor portion 78 of the floor 66 and onto the first floor portion 76 of the floor 66. The second member 96 of the locking member 60 tilts upwards. The first member 92 of the locking member 60 tilts forward. The tilting causes the locking member 60 to engage with the water reservoir 14, as further discussed below.

Figure 9:
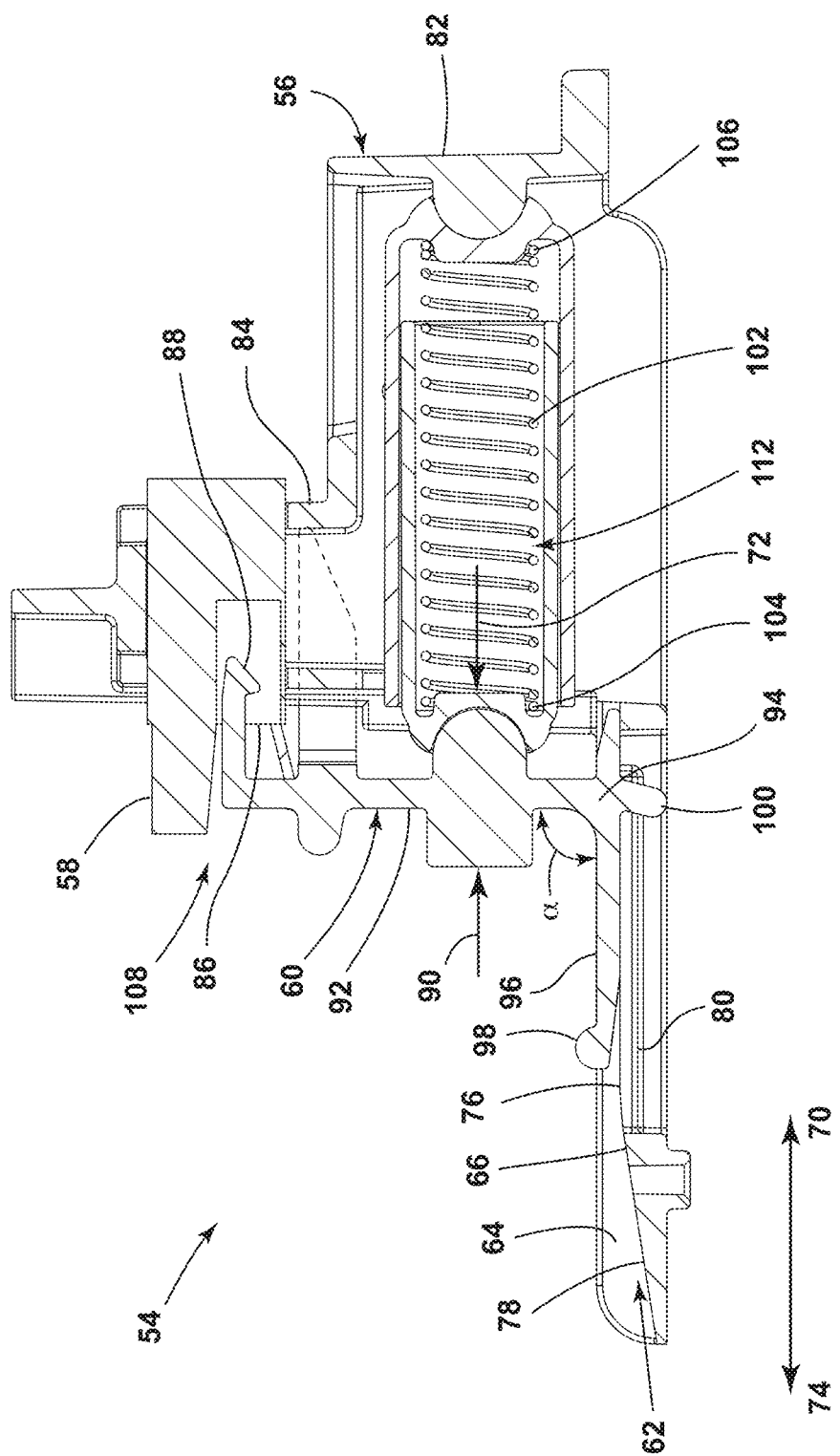
FIG. 9 is a side elevational view of a cross-section of the securement and release assembly of FIG. 6 taken through line IX-IX of FIG. 8, illustrating the locking member still in the latched state and a spring coupled to both the locking member and the platform, with the spring in an energized state applying a force in a forward direction upon the locking member that is insufficient to overcome the locking member in the latched state.
Figure 10:
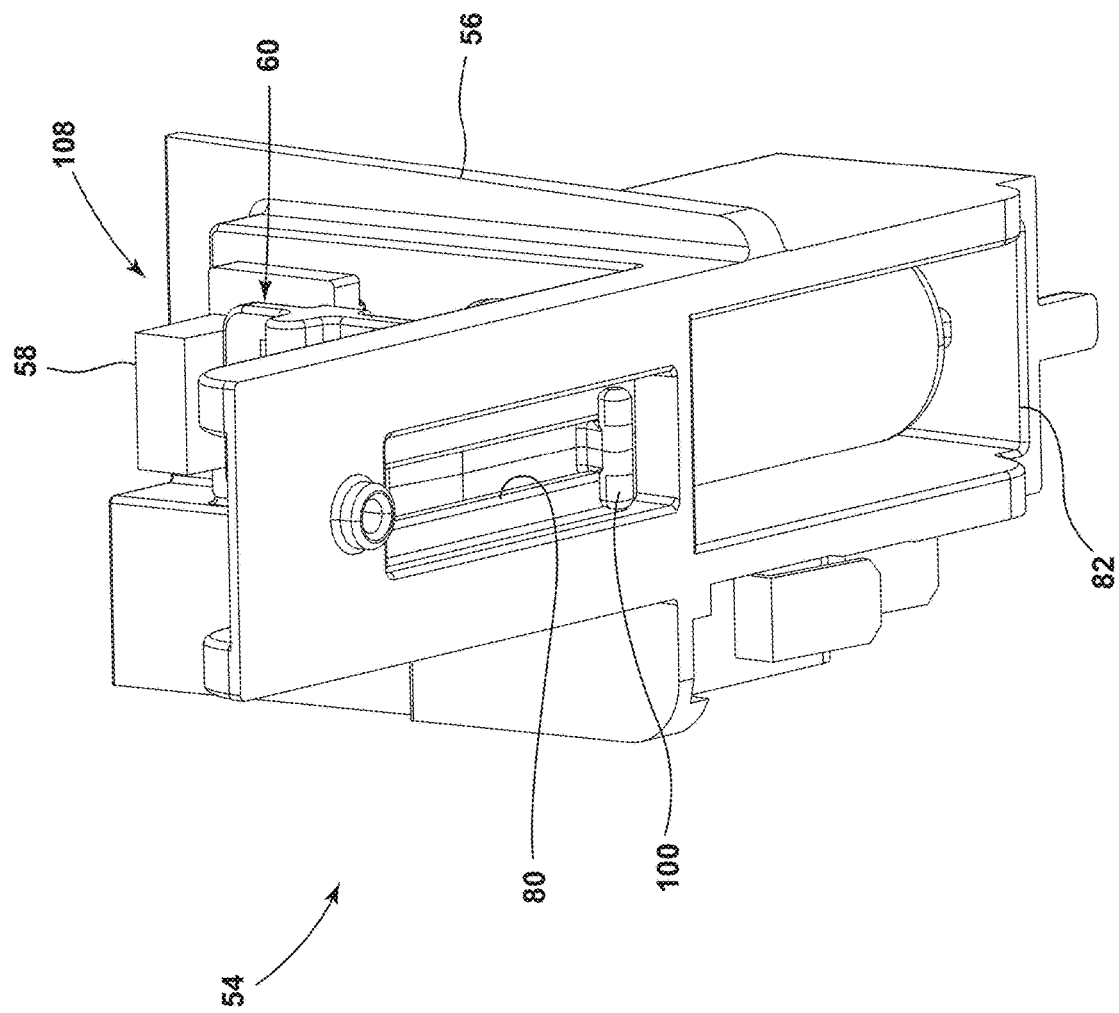
FIG. 10 is a bottom perspective view of the securement and release assembly of FIG. 6, illustrating the locking member including an appendage that extends through a slot through the platform and under the platform to limit the upward, forward, and rearward movements of the locking member relative to the platform.

As the force 68 continues to push the locking member 60 in the rearward direction 70 (see, e.g., FIG. 11 then FIG. 9 in sequence), the locking member 60 approaches the push-push latch 58 and the mating feature 88 enters into mating feature receiver 86 of the push-push latch 58, and eventually the locking member 60 takes the latched state 108 latched within the push-push latch 58 (see, e.g., FIG. 9). The force 68 ceases and the locking member 60 remains in the latched state 108. The spring 102 takes the energized state 112.

As mentioned, the subsequent force 90 (see, e.g., FIG. 9) in the rearward direction 70 onto the locking member 60, and subsequent release of the force, cause the push-push latch 58 (i) to unlatch from the mating feature 88 of the locking member 60 and (ii) to take the unlatched state 110. As the locking member 60 transitions out of the latched state 108, the spring 102 imparts the force 72 on the locking member 60 in the forward direction 74 (see, e.g., in sequence FIGS. 9, 11, and 12). The force 72 causes the locking member 60 to slide along the track 62 of the platform 56 in the forward direction 74 away from the push-push latch 58 until the locking member 60 reaches the extreme position 114 away from the push-push latch 58. As the locking member 60 moves away from the push-push latch 58 toward the extreme position 114, the locking member 60 tilts. In embodiments of the platform 56 where the floor 66 has the second floor portion 78, as the second member 96 of the locking member 60 moves off of the first floor portion 76 of the floor 66 and onto the second floor portion 78 of the floor 66, the locking member 60 tilts. The second member 96 of the locking member 60 tilts downward. The first member 92 of the locking member 60 tilts rearward. As further discussed below, the tilting causes the locking member 60 to disengage from the water reservoir 14.

Referring now to FIGS. 13-20, the water reservoir 14 includes an inlet 116 (FIG. 16), a chamber 118, and an outlet 120. The water reservoir 14 can further include a cap 122 that selectively covers or uncovers the inlet 116. The inlet 116 leads to the chamber 118. The chamber 118 is configured to hold water 124 that is delivered to the chamber 118 through the inlet 116. For example, the water reservoir 14 further includes a bottom 126, a top 128, and one more sidewalls 130 that define the chamber 118. The outlet 120 is sized and shaped to mate with the outlet 52 of the housing 36. The water 124 within the chamber 118 exits the chamber 118 through the outlet 120 and then through the outlet 52 of the housing 36, as will be further discussed below. In embodiments, the water reservoir 14 has a face 132 (see, e.g., FIG. 17) that faces the external environment 32. The face 132 of the water reservoir 14 can be flush with an exterior surface 134 of a control panel 136 of the oven 10.

Figure 17:
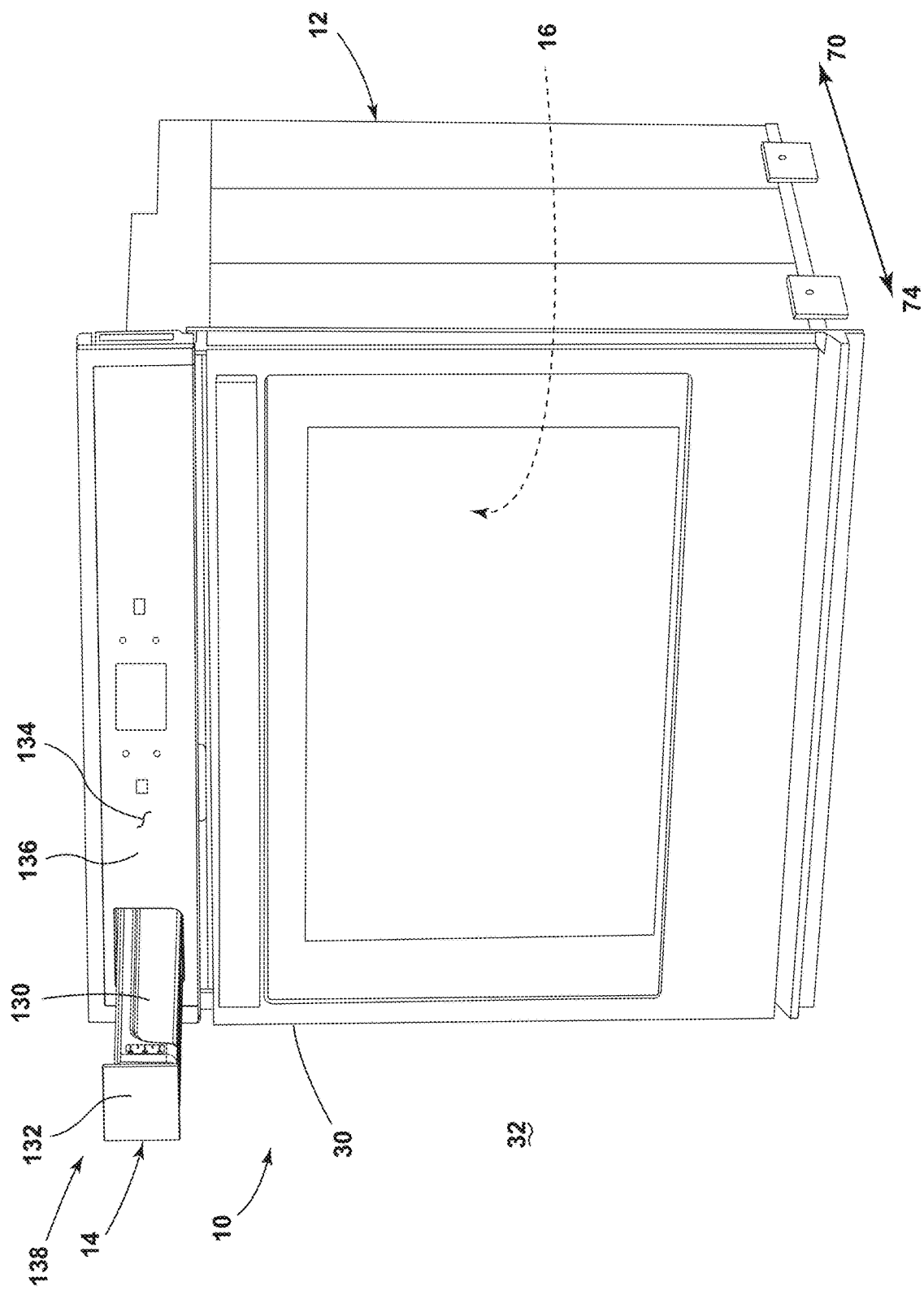
FIG. 17 is a front perspective view of the oven of FIG. 1, illustrating the water reservoir in a retracted state at least partially ejected from the oven to allow the user to access the inlet to add water to the chamber.

The water reservoir 14 can move to, from, and between an inserted state 138 (see, e.g., FIGS. 1, 2, 4, and 20) and a retracted state 140 (see, e.g., FIGS. 5 and 17). In the inserted state 138, the water reservoir 14 is disposed further into the oven 10 than in the retracted state 140. In embodiments, while in the inserted state 138, the face 132 of the water reservoir 14 is flush with the exterior surface 134 of the control panel 136 of the oven 10. In the retracted state 140, the water reservoir 14 is at least partially ejected from the appliance—sufficiently ejected so that the user can access the inlet 116 to add water 124 to the chamber 118 of the water reservoir 14. In embodiments, the water reservoir 14 is fully removable from the oven 10. In such instances, the user can transport the water reservoir 14 to a source of water 124, such as a faucet located in a kitchen. In other embodiments, the water reservoir 14 may not be fully removable from the oven 10 but the inlet 116 of the water reservoir 14 is accessible from the external environment 32 to add water 124 to the chamber 118.

Figure 18:
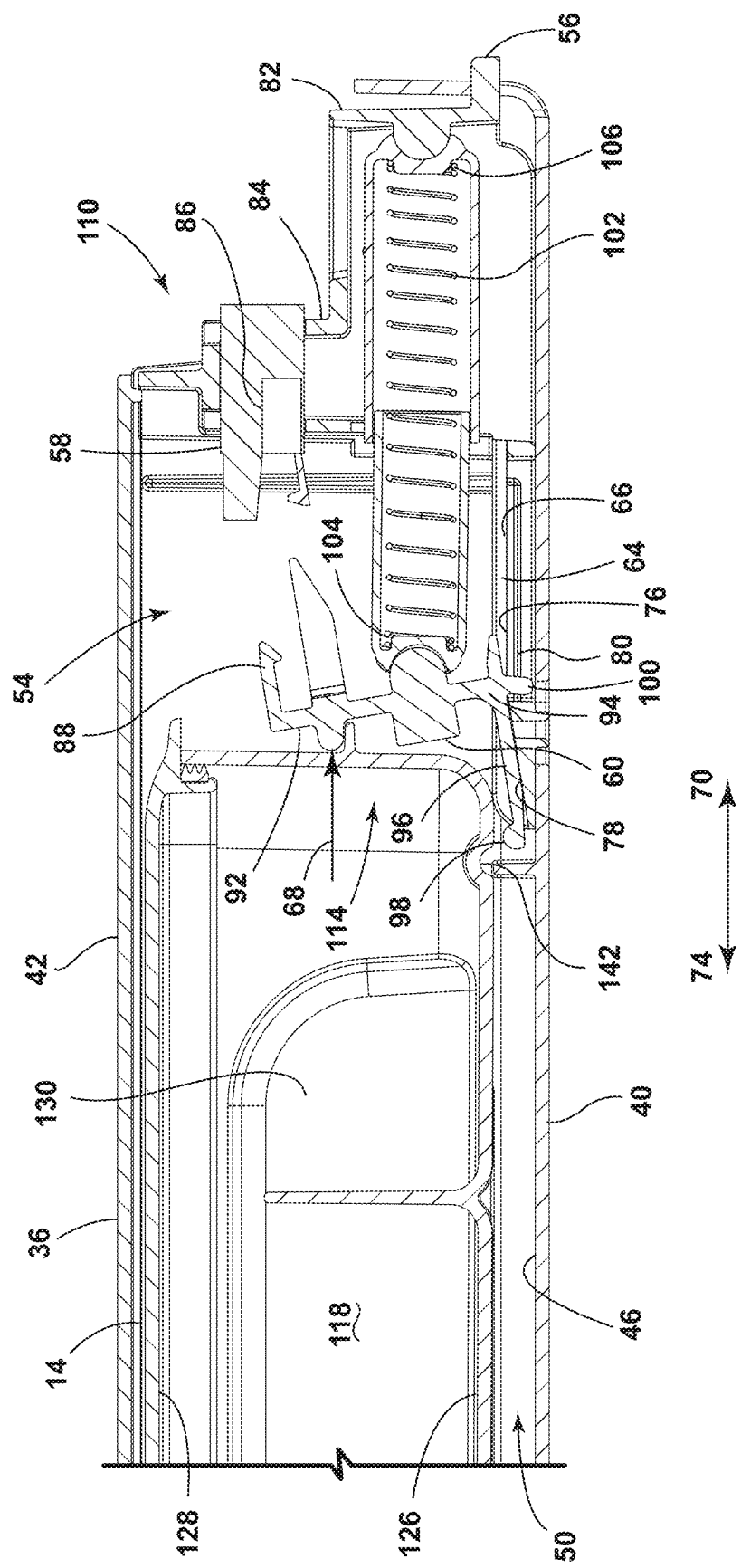
FIG. 18 is an elevational view of a cross-section of the water reservoir of FIG. 1 partially within the housing of FIG. 3, illustrating the locking member in the extreme position along the track away from the push-push latch and the projection extending upward from the second member of the locking member not mating with the recess at the bottom of the water reservoir.
Figure 19:
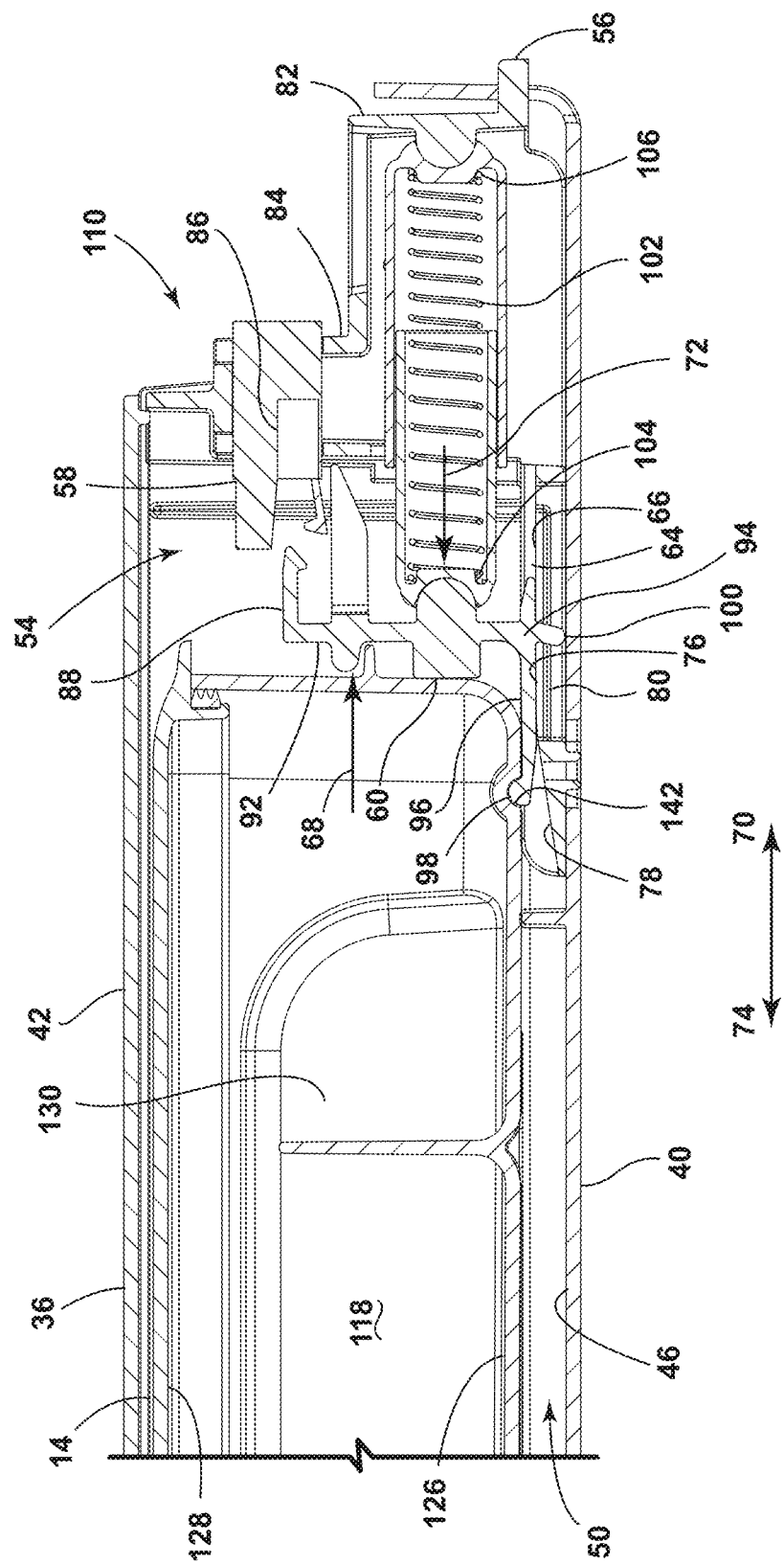
FIG. 19 is the same view as FIG. 18, but this time illustrating the locking member closer to the push-push latch and having tilted, such as in response to a force that the water reservoir imparts in the rearward direction upon the locking member, but still in the unlatched position, and the projection extending upward from the second member of the locking member mating with the recess at the bottom of the water reservoir.
Figure 20:
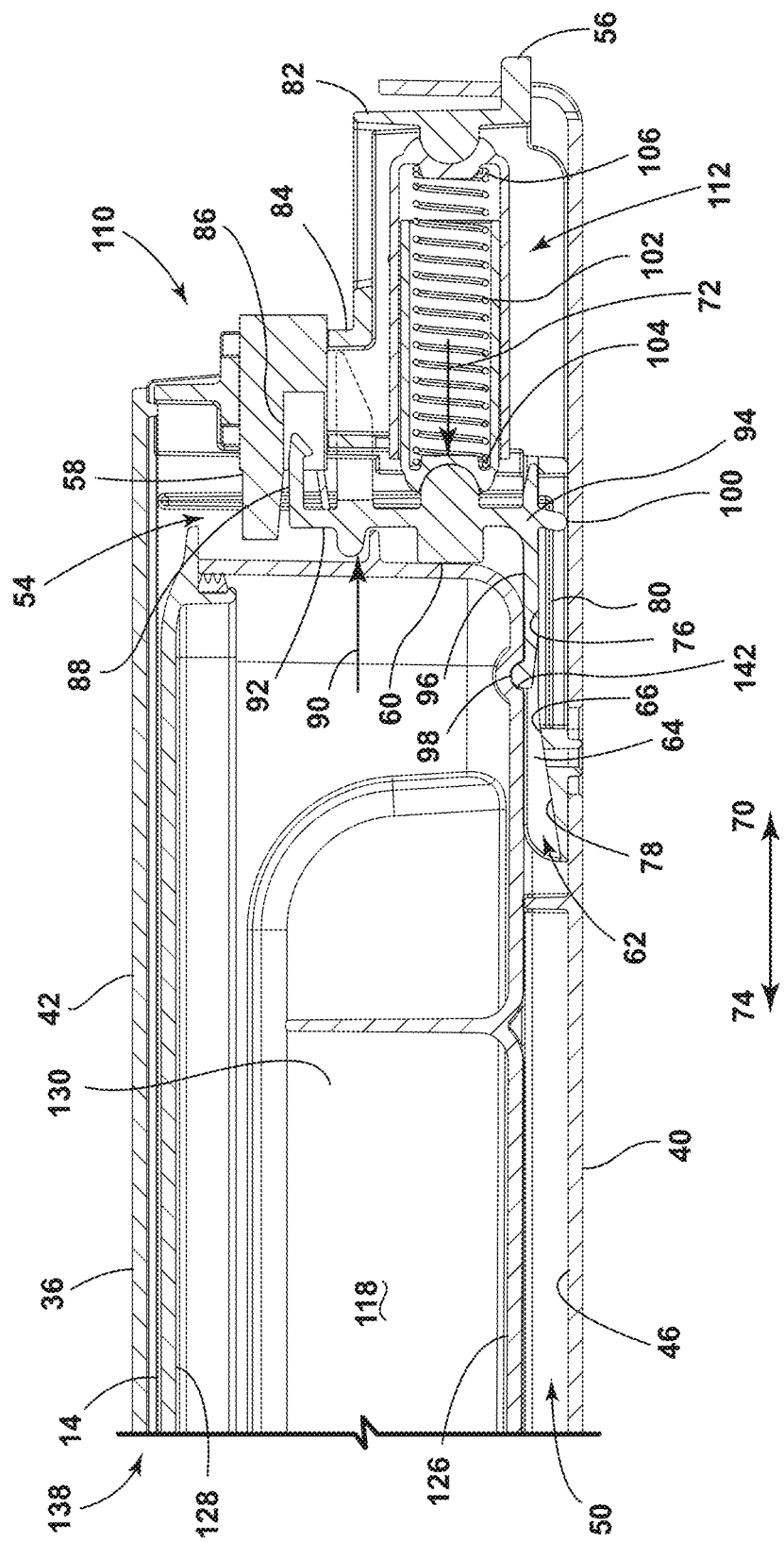
FIG. 20 is the same view as FIGS. 18 and 19, but this time the locking member is in the latched position latched to the push-push latch as the water reservoir is pushed completely to the inserted state within the housing of the oven.

As the water reservoir 14 transitions in the rearward direction 70 from the retracted state 140 to the inserted state 138 within the housing 36 (see FIGS. 17-20 in sequence), the water reservoir 14 eventually contacts the locking member 60 (see FIG. 18). The water reservoir 14 imparts the force 68 in the rearward direction 70 upon the first member 92 of the locking member 60. The force 68 from the water reservoir 14 causes the locking member 60 to slide along the track 62 of the platform 56 in the rearward direction 70. Eventually, the force 68 from the water reservoir 14 upon the locking member 60 causes the mating feature 88 of the locking member 60 to engage with the push-push latch 58, with the mating feature 88 entering the mating feature receiver 86 of the push-push latch 58 thereby placing the locking member 60 in the latched state 108 (see FIG. 20). As mentioned, the water reservoir 14 imparting the force 68 upon the locking member 60 toward the latched state 108 causes the first end 104 of the spring 102 to move toward the second end 106 of the spring 102 and thus energizes the spring 102. In embodiments, the water reservoir 14 imparts the force 68 upon the locking member 60 because the user, from the external environment 32, pushes the water reservoir 14 reward into the housing 36 of the oven 10.

The locking member 60 and the water reservoir 14 are configured to engage to secure the water reservoir 14 to the securement and release assembly 54, and thus the oven 10, as the locking member 60 takes the latched state 108. For example, the water reservoir 14 further includes a recess 142 into the bottom 126. The recess 142 extends upward. As locking member 60 engages with the push-push latch 58, the projection 98 of the locking member 60 engages with the recess 142 of the water reservoir 14. In embodiments, the force 68 pushing the first member 92, as discussed above, causes the locking member 60 to tilt relative to the platform 56. The second member 96 moves upward toward the water reservoir 14 and the projection 98 extending from the second member 96 engages with the recess 142 of the water reservoir 14. The engagement may be of the mating manner, with the projection 98 of the locking member 60 being disposed within the recess 142 of the water reservoir 14. The projection 98 and the recess 142 are each sized and shape to engage in this mating manner. With this engagement, the securement and release assembly 54 secures the water reservoir 14 in place in the inserted state 138. Stated another way, when the locking member 60 is in the latched state 108 and the water reservoir 14 is in the inserted state 138, the mating feature 88 of the locking member 60 is disposed within the mating feature receiver 86 of the push-push latch 58 and the projection 98 of the locking member 60 is disposed within the recess 142 of the water reservoir 14 thus securing the water reservoir 14 to the securement and release assembly 54 and thus the oven 10. The engagement of the projection 98 and the recess 142 resists a force 144 (see FIG. 4) attempting to pull the water reservoir 14 in the forward direction 74 away from the push-push latch 58. That is, the engagement of the projection 98 and the recess 142 resists movement of the water reservoir 14 away from the inserted state 138.

To again place the water reservoir 14 in the retracted state 140, the water reservoir 14 imparts, and then releases, the subsequent force 90 (see, e.g., FIG. 20) upon the locking member 60. That action causes the push-push latch 58 to unlatch from the locking member 60—the locking member 60 takes the unlatched state 110. The user applying, and then releasing a force 143 (see FIG. 1) from the external environment 32 to push the water reservoir 14 in the rearward direction 70 into the oven 10 causes the water reservoir 14 to impart, and then release, the subsequent force 90 upon the locking member 60. In other words, the force 143 causes the locking member 60 to transition from the latched state 108 to the unlatched state 110. The spring 102, having been in the energized state 112, imparts the force 72 on the locking member 60, which pushes the locking member 60 and thus the water reservoir 14 in the forward direction 74 away from the push-push latch 58, with the locking member 60 sliding along the track 62, and causes the water reservoir 14 to move away from the inserted state 138 and at least partially eject from the housing 36 of the oven 10. The water reservoir 14 can then decouple from the locking member 60. As the locking member 60 progresses in the forward direction 74 away from the push-push latch 58, either in response to the force 72 from the spring 102 or a force 144 (see FIG. 4) from the user pulling the water reservoir 14, the locking member 60 tilts forward, with the second member 96 of the locking member 60 moving downward and thus disengaging from the recess 142 of the water reservoir 14. The force 144 from the user can then continue to retract the water reservoir 14 from the oven 10 to the retracted state 140.

As mentioned, the oven 10 has steam cooking functionality provided by the steam generating system 18 (see, e.g., FIG. 3). The water reservoir 14 provides the water 124 that the steam generating system 18 transforms into the steam 34 for delivery to the cooking chamber 16. The steam generating system 18 can be disposed on the cabinet 12 and outside of the cooking chamber 16.

The steam generating system 18 is configured to obtain water 124 from the water reservoir 14, when the water reservoir 14 takes the inserted state 138 and the locking member 60 is in the latched state 108. For example, the steam generating system 18 can further include a lower tank 146 and a valve assembly 148. The lower tank 146 is in fluid communication with the valve assembly 148, and the valve assembly 148 is in fluid communication with the water reservoir 14 via the housing 36. The valve assembly 148 controls the flow of water 124 from the water reservoir 14 to the lower tank 146. Appropriate plumbing like tubes and connectors (not illustrated) can provide the fluid communication between the outlet 52 of the housing 36 and the valve assembly 148. The chamber 118 of the water reservoir 14 can be placed in fluid communication with the valve assembly 148 upon being placed in the inserted state 138 with the locking member 60 in the latched state 108. The water 124 can flow from the chamber 118 of the water reservoir 14, through the outlet 120 of the water reservoir 14, through the outlet 52 of the housing 36, and through tubing to the valve assembly 148 via Earth's gravitational force. Further plumbing (not illustrated) can provide the fluid communication between the valve assembly 148 and the lower tank 146. The valve assembly 148 can be manipulated to allow the water 124 to flow through the valve assembly 148 to the lower tank 146.

The steam generating system 18 can further include a boiler 150 and a phase separator 152. A first end 154 of the boiler 150 is in fluid communication with the lower tank 146. A second end 156 of the boiler 150 is in fluid communication with the phase separator 152. The phase separator 152 is in further fluid communication with the cooking chamber 16 and the lower tank 146. The boiler 150 includes a heating element to heat the water 124, such as into a steam and water mixture. The steam and water mixture flows from the boiler 150 to the phase separator 152. The water and steam mixture provided from the boiler 150 is separated at the phase separator 152 into the steam 34, which is directed toward the cooking chamber 16 during a steam cooking procedure, and water 124, which is directed toward the lower tank 146 for re-entry into the steam generating procedure. The steam 34 within the phase separator 152 from the steam and water mixture is delivered to the cooking chamber 16 via appropriate plumbing (not illustrated). Further details about components of a steam generating system 18 suitable for use with the water reservoir 14 and securement and release assembly 54 of the present disclosure can be found at United States Patent Application Publication No. US20190309957A1, the content of which is incorporated by reference herein in its entirety.

The securement and release assembly 54 can be utilized in any appliance (not just the oven 10) to engage with and secure any component of the appliance (not just the water reservoir 14) within the appliance. Example appliances include a slow cooker, a microwave, a toaster oven, a refrigerator, an icemaker, a freezer, and so on.

The securement and release assembly 54 addresses the problem of securing a component of an appliance, such as the water reservoir 14 of the oven 10, among other ways, by utilizing less parts than other more complicated mechanisms, thus lowering the cost to manufacture.

According to a first aspect of the present disclosure, a securement and release assembly for a component of an appliance comprises: (a) a platform configured to couple to a cabinet of an appliance, the platform comprising a track; (b) a push-push latch attached to the platform, the push-push latch comprising a mating feature receiver; and (c) a locking member slidably coupled to the track of the platform, the locking member comprising a mating feature configured to engage with the mating feature receiver of the push-push latch, wherein (i) the locking member slides along the track toward the mating feature receiver of the push-push latch to transition from an unlatched state, wherein the mating feature is not latched within the mating feature receiver of the push-push latch, to a latched state, wherein the mating feature is inserted into the mating feature receiver of the push-push latch and latched therein, (ii) the locking member is configured to interact with a component of an appliance to secure the component to the appliance when the locking member takes the latched state, and (iii) the component can be decoupled from the locking member when the locking member takes the unlatched state.

According to a second aspect of the present disclosure, the securement and release assembly of the first aspect further comprises: a spring attached to the platform, the spring comprising an energized state when the locking member is in the latched state, wherein, as the locking member transitions out of the latched state, the spring imparts a force on the locking member causing the locking member to slide along the track of the platform away from the push-push latch.

According to a third aspect of the present disclosure, the securement and release assembly of the second aspect is presented, wherein (i) the spring further comprises a first end and a second end, (ii) the first end of the spring is attached to the locking member, and (iii) the second end of the spring is attached to the platform.

According to a fourth aspect of the present disclosure, the securement and release assembly of any one of the first through third aspects is presented, wherein (a) the locking member further comprises (i) a first member extending from a junction, the mating feature disposed at the first member, and (ii) a second member extending from the junction, the second member and the first member separated by an angle, and the second member comprising a projection configured to mate with a component of the appliance to be secured in place via the securement and release assembly, and (b) in the latched state, the mating feature of the locking member is inserted into the mating feature receiver of the push-push latch, and the projection of the locking member mates with the component of the appliance thus securing the component to the securement and release assembly.

According to a fifth aspect of the present disclosure, the securement and release assembly of any one of the first through fourth aspects is presented, wherein the appliance is an oven with steam cooking functionality and the component is a water reservoir configured to provide water.

According to a sixth aspect of the present disclosure, the securement and release assembly of any one of the first through fifth aspects is presented, wherein (a) the platform comprises (i) a floor upon which the locking member slides to transition into and out of the latched state, (ii) a pair of opposing sidewalls extending upward from the floor and a slot between the opposing sidewalls, the opposing sidewalls and the floor at least partially defining the track, and (iii) a wall configured to couple to a first end of a spring, and (b) the locking member further comprises an appendage extending through the slot of the platform.

According to a seventh aspect of the present disclosure, the securement and release assembly of the sixth aspect further comprises: a spring comprising (i) a first end attached to the wall of the platform and (ii) a second end attached to the locking member, wherein, the spring is disposed elevationally higher than the track and elevationally lower than the push-push latch.

According to an eighth aspect of the present disclosure, the securement and release assembly of any one of the first through seventh aspects is presented, wherein the locking member tilts relative to the platform as the locking member moves away from the push-push latch in the detached state.

According to a ninth aspect of the present disclosure, the securement and release assembly of any one of the first through eighth aspects is presented, wherein the locking member comprises a first member extending from a junction and a second member extending from the junction orthogonally to the first member, the mating feature extending from the first member.

According to a tenth aspect of the present disclosure, the securement and release assembly of the ninth aspect further comprises a spring comprising (i) a first end attached to the platform and (ii) a second end attached to the first member of the locking member, wherein, the spring is energized and imparts a force against the first member when the locking member is in the latched state.

According to an eleventh aspect of the present disclosure, the tenth aspect is presented, wherein as the locking member transitions in the detached position from an extreme position away from the push-push latch toward the push-push latch, the locking member tilts relative to the platform with the first member of the locking member tilting toward the push-push latch and the second member of the locking member tilting upwards.

According to a twelfth aspect of the present disclosure, any one of the first through eleventh aspects is presented, wherein (i) the securement and release assembly is of an appliance, the appliance further comprising a component that is movable to, from, and between an inserted state and a retracted state, (ii) the component is disposed further into the appliance in the inserted state than in the retracted state, and (iii) as the component moves from the retracted state to the inserted state, the component causes the locking member to slide along the track of the platform until the mating feature of the locking member engages with the push-push latch and the locking member takes the latched state.

According to a thirteenth aspect of the present disclosure, the twelfth aspect is presented, wherein (a) the locking member comprises (i) a first member extending from a junction, the mating feature extending from the first member, (ii) a second member extending from the junction, and (iii) a projection extending from the second member, (b) the component further comprises a recess configured to engage with the projection extending from the second member of the locking member, (c) as the component moves from the retracted state to the inserted state, the component pushes against the first member of the locking member and causes the locking member to tilt relative to the platform with the second member moving toward the component and the projection extending from the second member engaging with the recess of the component, and (d) when the component is in the inserted state and the locking member is in the latched state, the engagement of the projection of the locking member and the recess of the component resists a force pulling the component away from the push-push latch.

According to a fourteenth aspect of the present disclosure, the thirteenth aspect further comprises a spring comprising a first end attached to the platform and a second end attached to the locking member; wherein, (a) as the component pushes the locking member toward the latched state, the spring becomes energized, and (b) a force pushing the component from the inserted state into the appliance and subsequent release of the force cause the locking member to transition from the latched state to the detached state, and the spring imparts a force upon the locking member that (i) moves the mating feature of the locking member away from the push-push latch, (ii) causes the locking member to slide along the track, and (iii) causes the component to move to the retracted state at least partially ejected from the appliance.

According to a fifteenth aspect of the present disclosure, the twelfth aspect is presented, wherein (i) the appliance is an oven with steam cooking functionality, and (ii) the component is a water reservoir configured to supply the steam cooking functionality with water.

According to a sixteenth aspect of the present disclosure, an appliance comprises: (A) a cabinet; (B) a platform attached to the cabinet, the platform comprising a track; (C) a push-push latch attached to the platform, the push-push latch comprising a mating feature receiver; (D) a locking member slidably coupled to the track of the platform, the locking member comprising (i) a first member and a second member extending from a junction, the first member and the second member separated by an angle, (ii) a mating feature extending from the first member configured to interact with the mating feature receiver of the push-push latch, (iii) a projection extending from the second member, (iv) a latched state where the mating feature is inserted into the mating feature receiver of the push-push latch and latched therein, and (v) an unlatched state where the mating feature is not latched within the mating feature receiver of the push-push latch; (E) a spring comprising (i) a first end attached to the first member of the locking member and (ii) a second end attached to the platform; and (F) a component comprising (i) a recess configured to engage with the projection extending from the second member of the locking member, (ii) an inserted state, and (iii) a retracted state, the component being disposed further into the appliance in the inserted state than in the retracted state, and in the retracted state, the component is at least partially ejected from the appliance, wherein, when the component is in the inserted state and the locking member is in the latched state, the projection extending from the second cantilever of the locking member is engaged with the recess of the component, the projection and the recess resisting movement of the component away from the inserted state.

According to a seventeenth aspect of the present disclosure, the sixteenth aspect is presented, wherein as the component transitions from the retracted state to the inserted state, the component pushes the first member of the locking member (i) causing the second member of the locking member to engage with the recess of the component, (ii) causing the locking member to slide along the track of the platform until the mating feature extending from the first member of the locking member mates with the mating feature receiver of the push-push latch, thereby placing the locking member in the latched position, and (iii) causing the second end of the spring to move towards the first end of the spring thus energizing the spring.

According to an eighteenth aspect of the present disclosure, the seventeenth aspect is presented, wherein a force pushing the component further into the appliance after being in the inserted state and subsequent release of the force cause (i) the locking member to take the unlatched state, unlatched from the push-push latch, (ii) the spring to push the locking member along the track of the platform away from the push-push latch with the locking member tilting so that the projection extending from the second member disengages from the recess of the component, and (iii) the component to at least partially eject from the appliance.

According to a nineteenth aspect of the present disclosure, an oven for cooking food comprises: (A) a cabinet; (B) a platform attached to the cabinet, the platform comprising a track; (C) a push-push latch attached to the platform, the push-push latch comprising a mating feature receiver; (D) a locking member slidably coupled to the track of the platform, the locking member comprising (i) a first member and a second member extending from a junction, the first member and the second member separated by an angle, (ii) a mating feature extending from the first member configured to interact with the mating feature receiver of the push-push latch, (iii) a projection extending from the second member, (iv) a latched state where the mating feature is inserted into the mating feature receiver of the push-push latch and latched therein, and (v) an unlatched state where the mating feature is not latched within the mating feature receiver of the push-push latch; (E) a spring comprising (i) a first end attached to the first member of the locking member and (ii) a second end attached to the platform; (F) a water reservoir comprising (i) a recess configured to engage with the projection extending from the second member of the locking member, (ii) an inserted state, (iii) a retracted state, the water reservoir being disposed further into the appliance in the inserted state than in the retracted state, and in the retracted state, the water reservoir is at least partially ejected from the appliance, and (iv) a chamber configured to hold water; (G) a cooking chamber configured to accept food for cooking; and (H) a steam generating system configured (i) to obtain water from the water reservoir when the water reservoir is in the inserted state and (ii) to transform the water into steam for subsequent delivery to the cooking chamber; wherein, (1) when the water reservoir is in the inserted state and the locking member is in the latched state, the projection extending from the second member of the locking member is engaged with the recess of the water reservoir, the projection and the recess resisting movement of the water reservoir away from the inserted state; (2) as the water reservoir transitions from the retracted state to the inserted state, the water reservoir pushes the first member of the locking member (i) causing the locking member to tilt and the projection of the locking member to engage with the recess of the water reservoir, (ii) causing the locking member to slide along the track of the platform until the mating feature extending from the first member of the locking member to enter the mating feature receiver of the push-push latch thereby placing the locking member in the latched position, and (iii) causing the first end of the spring to move towards the second end of the spring thus energizing the spring; and (3) a force pushing the water reservoir further into the oven after being in the inserted state and subsequent release of the force cause (i) the locking member to take the unlatched state, unlatched from the push-push latch, (ii) the spring to push the locking member along the track of the platform away from the push-push latch with the locking member pivoting so that the projection extending from the second member disengages from the recess of the water reservoir, and (iii) the water reservoir to at least partially eject from the oven.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A securement and release assembly for a component of an appliance comprising:
 a platform configured to couple to a cabinet of an appliance, the platform comprising a track;
 a push-push latch attached to the platform away from the track of the platform, the push-push latch comprising a mating feature receiver; and
 a locking member slidably coupled to the track of the platform, the locking member comprising a mating feature configured to engage with the mating feature receiver of the push-push latch, the mating feature disposed away from the track of the platform,
 wherein, the locking member slides along the track toward the mating feature receiver of the push-push latch to transition from an unlatched state, wherein the mating feature is not latched within the mating feature receiver of the push-push latch, to a latched state, wherein the mating feature is inserted into the mating feature receiver of the push-push latch and latched therein,
 wherein, the locking member is configured to interact with a component of an appliance to lock the component to the appliance when the locking member takes the latched state, and
 wherein, the component can be decoupled from the locking member when the locking member takes the unlatched state.

2. The securement and release assembly of claim 1 further comprising:
 a spring attached to the platform, the spring comprising an energized state when the locking member is in the latched state,
 wherein, as the locking member transitions out of the latched state, the spring imparts a force on the locking member causing the locking member to slide along the track of the platform away from the push-push latch.

3. The securement and release assembly of claim 2, wherein
 the spring further comprises a first end and a second end;
 the first end of the spring is attached to the locking member; and
 the second end of the spring is attached to the platform.

4. The securement and release assembly of claim 1, wherein
 the locking member further comprises:
  a first member extending from a junction, the mating feature disposed at the first member; and
  a second member extending from the junction, the second member and the first member separated by an angle, and the second member comprising a projection configured to mate with the component of the appliance to be locked in place via the securement and release assembly,
 wherein, in the latched state, the mating feature of the locking member is inserted into the mating feature receiver of the push-push latch and the projection of the locking member mates with the component of the appliance thus locking the component to the securement and release assembly.

5. The securement and release assembly of claim 1, wherein
 the appliance is an oven with steam cooking functionality and the component is a water reservoir configured to provide water.

6. The securement and release assembly of claim 1, wherein
 the platform comprises (i) a floor upon which the locking member slides to transition into and out of the latched state, (ii) a pair of opposing sidewalls extending upward from the floor and a slot between the opposing sidewalls, the opposing sidewalls and the floor at least partially defining the track, and (iii) a wall configured to couple to a first end of a spring,
 wherein, the locking member further comprises an appendage extending through the slot of the platform.

7. The securement and release assembly of claim 6 further comprising:
 a spring comprising (i) a first end attached to the wall of the platform and (ii) a second end attached to the locking member,
 wherein, the spring is disposed elevationally higher than the track and elevationally lower than the push-push latch.

8. The securement and release assembly of claim 1, wherein
 the locking member tilts relative to the platform as the locking member moves away from the push-push latch in the detached state.

9. The securement and release assembly of claim 1, wherein
 the locking member comprises a first member extending from a junction and a second member extending from the junction orthogonally to the first member, the mating feature extending from the first member.

10. The securement and release assembly of claim 9 further comprising:
 a spring comprising (i) a first end attached to the platform and (ii) a second end attached to the first member of the locking member,
 wherein, the spring is energized and imparts a force against the first member when the locking member is in the latched state.

11. The securement and release assembly of claim 10, wherein
 as the locking member transitions in the detached position from an extreme position away from the push-push latch toward the push-push latch, the locking member tilts relative to the platform with the first member of the locking member tilting toward the push-push latch and the second member of the locking member tilting upwards.

12. The securement and release assembly of claim 1, wherein
 the securement and release assembly is of an appliance, the appliance further comprising the component that is movable to, from, and between an inserted state and a retracted state;
 the component is disposed further into the appliance in the inserted state than in the retracted state; and
 as the component moves from the retracted state to the inserted state, the component causes the locking member to slide along the track of the platform until the mating feature of the locking member engages with the push-push latch and the locking member takes the latched state.

13. The securement and release assembly of claim 12, wherein
 the locking member comprises (i) a first member extending from a junction, the mating feature extending from the first member, (ii) a second member extending from the junction, and (iii) a projection extending from the second member;

the component further comprises a recess configured to engage with the projection extending from the second member of the locking member;

as the component moves from the retracted state to the inserted state, the component pushes against the first member of the locking member and causes the locking member to tilt relative to the platform with the second member moving toward the component and the projection extending from the second member engaging with the recess of the component; and when the component is in the inserted state and the locking member is in the latched state, the engagement of the projection of the locking member and the recess of the component resist a force pulling the component away from the push-push latch.

14. The securement and release assembly of claim 13 further comprising:

a spring comprising a first end attached to the platform and a second end attached to the locking member;

wherein, as the component pushes the locking member toward the latched state, the spring becomes energized; and wherein, a force pushing the component from the inserted state into the appliance and subsequent release of the force cause the locking member to transition from the latched state to the detached state, and the spring imparts a force upon the locking member that (i) moves the mating feature of the locking member away from the push-push latch, (ii) causes the locking member to slide along the track, and (iii) causes the component to move to the retracted state at least partially ejected from the appliance.

15. The securement and release assembly of claim 12, wherein the appliance is an oven with steam cooking functionality; and the component is a water reservoir configured to supply the steam cooking functionality with water.

16. An appliance comprising:

a cabinet;

a platform attached to the cabinet, the platform comprising a track;

a push-push latch attached to the platform away from the track of the platform, the push-push latch comprising a mating feature receiver;

a locking member slidably coupled to the track of the platform, the locking member comprising (i) a first member and a second member extending from a junction, the first member and the second member separated by an angle, the first member extending away from the track of the platform, (ii) a mating feature extending from the first member configured to interact with the mating feature receiver of the push-push latch, (iii) a projection extending from the second member, (iv) a latched state where the mating feature is inserted into the mating feature receiver of the push-push latch and latched therein, and (v) an unlatched state where the mating feature is not latched within the mating feature receiver of the push-push latch;

a spring comprising (i) a first end attached to the first member of the locking member and (ii) a second end attached to the platform; and a component comprising (i) a recess configured to engage with the projection extending from the second member of the locking member, (ii) an inserted state, and (iii) a retracted state, the component being disposed further into the appliance in the inserted state than in the retracted state, and in the retracted state, the component is at least partially ejected from the appliance, wherein, when the component is in the inserted state and the locking member is in the latched state, the projection extending from the second member of the locking member is engaged with the recess of the component, the projection and the recess resisting movement of the component away from the inserted state.

17. The appliance of claim 16, wherein as the component transitions from the retracted state to the inserted state, the component pushes the first member of the locking member (i) causing the second member of the locking member to engage with the recess of the component, (ii) causing the locking member to slide along the track of the platform until the mating feature extending from the first member of the locking member mates with the mating feature receiver of the push-push latch thereby placing the locking member in the latched position, and (iii) causing the second end of the spring to move towards the first end of the spring thus energizing the spring.

18. The appliance of claim 17, wherein a force pushing the component further into the appliance after being in the inserted state and subsequent release of the force cause (i) the locking member to take the unlatched state, unlatched from the push-push latch, (ii) the spring to push the locking member along the track of the platform away from the push-push latch with the locking member tilting so that the projection extending from the second member disengages from the recess of the component, and (iii) the component to at least partially eject from the appliance.

19. An oven for cooking food comprising:

a cabinet;

a platform attached to the cabinet, the platform comprising a track;

a push-push latch attached to the platform away from the track of the platform, the push-push latch comprising a mating feature receiver;

a locking member slidably coupled to the track of the platform, the locking member comprising (i) a first member and a second member extending from a junction, the first member and the second member separated by an angle, the first member extending away from the track of the platform, (ii) a mating feature extending from the first member configured to interact with the mating feature receiver of the push-push latch, (iii) a projection extending from the second member, (iv) a latched state where the mating feature is inserted into the mating feature receiver of the push-push latch and latched therein, and (v) an unlatched state where the mating feature is not latched within the mating feature receiver of the push-push latch;

a spring comprising (i) a first end attached to the first member of the locking member and (ii) a second end attached to the platform;

a water reservoir comprising (i) a recess configured to engage with the projection extending from the second member of the locking member, (ii) an inserted state, (iii) a retracted state, the water reservoir being disposed further into the appliance in the inserted state than in the retracted state, and in the retracted state, the water reservoir is at least partially ejected from the appliance, and (iv) a chamber configured to hold water;

a cooking chamber configured to accept food for cooking; and a steam generating system configured (i) to obtain water from the water reservoir when the water reservoir is in the inserted state and (ii) to transform the water into steam for subsequent delivery to the cooking chamber;

wherein, when the water reservoir is in the inserted state and the locking member is in the latched state, the projection extending from the second member of the locking member is engaged with the recess of the water reservoir, the projection and the recess resisting movement of the water reservoir away from the inserted state;

wherein, as the water reservoir transitions from the retracted state to the inserted state, the water reservoir pushes the first member of the locking member (i) causing the locking member to tilt and the projection of the locking member to engage with the recess of the water reservoir, (ii) causing the locking member to slide along the track of the platform until the mating feature extending from the first member of the locking member enters the mating feature receiver of the push-push latch thereby placing the locking member in the latched position, and (iii) causing the first end of the spring to move towards the second end of the spring thus energizing the spring; and wherein, a force pushing the water reservoir further into the oven after being in the inserted state and subsequent release of the force cause (i) the locking member to take the unlatched state, unlatched from the push-push latch, (ii) the spring to push the locking member along the track of the platform away from the push-push latch with the locking member pivoting so that the projection extending from the second member disengages from the recess of the water reservoir, and (iii) the water reservoir to at least partially eject from the oven.

* * * * *